United States Patent [19]
Takagi et al.

[11] Patent Number: 6,098,029
[45] Date of Patent: Aug. 1, 2000

[54] LIQUID-LEVEL POSITION MEASURING METHOD AND SYSTEM

[75] Inventors: Yoichi Takagi, Hitachi; Takatoshi Kodaira, Musashino; Yoshiki Kobayashi, Hitachi; Masao Takatou, Hitachinaka; Hirotomo Horita, Chiba; Kunizo Sakai, Hitachi, all of Japan

[73] Assignee: Hitachi, Ltd., Tokyo, Japan

[21] Appl. No.: 09/098,463

[22] Filed: Jun. 17, 1998

Related U.S. Application Data

[63] Continuation of application No. 08/857,600, May 16, 1997, abandoned, which is a continuation of application No. 08/480,101, Jun. 7, 1995, abandoned.

[30] Foreign Application Priority Data

Jun. 14, 1994 [JP] Japan ................................. 6-131594
Jul. 28, 1994 [JP] Japan ................................. 6-176452
Nov. 16, 1994 [JP] Japan ................................. 6-281942

[51] Int. Cl.$^7$ .................................................. G06K 9/00
[52] U.S. Cl. ......................... 702/127; 382/100; 73/293; 702/55
[58] Field of Search .................... 702/55, 127; 382/100, 382/288, 266, 209, 142, 151, 193, 201, 203; 137/1; 356/133; 73/293, 290 R

[56] References Cited

U.S. PATENT DOCUMENTS

| | | | |
|---|---|---|---|
| 4,202,398 | 5/1980 | Osugi | 164/150 |
| 4,298,887 | 11/1981 | Rode | 358/113 |
| 4,576,197 | 3/1986 | Kempers | 137/565 |
| 4,733,095 | 3/1988 | Kurahashi et al. | 250/577 |
| 5,136,661 | 8/1992 | Kobayasi et al. | 382/48 |
| 5,414,778 | 5/1995 | Schwartz et al. | 382/142 |
| 5,427,161 | 6/1995 | Luhmann et al. | 141/144 |
| 5,495,429 | 2/1996 | Craven et al. | 364/526 |

Primary Examiner—Patrick Assouad
Attorney, Agent, or Firm—Kenyon & Kenyon

[57] ABSTRACT

The present invention has an object to measure the height of a liquid surface automatically by an image processing. According to the present invention, therefore, the situation over a side wall and the situation of the liquid surface in the image, as taken from an ITV camera, of the neighborhood of the liquid surface are image-analyzed to estimate the boundary position between the side wall and the liquid surface thereby to determine the position of the liquid surface on the image, and the liquid-surface position on the image is transformed from an image coordinate system to a real spatial coordinate system to determine a real position of the liquid surface.

9 Claims, 34 Drawing Sheets

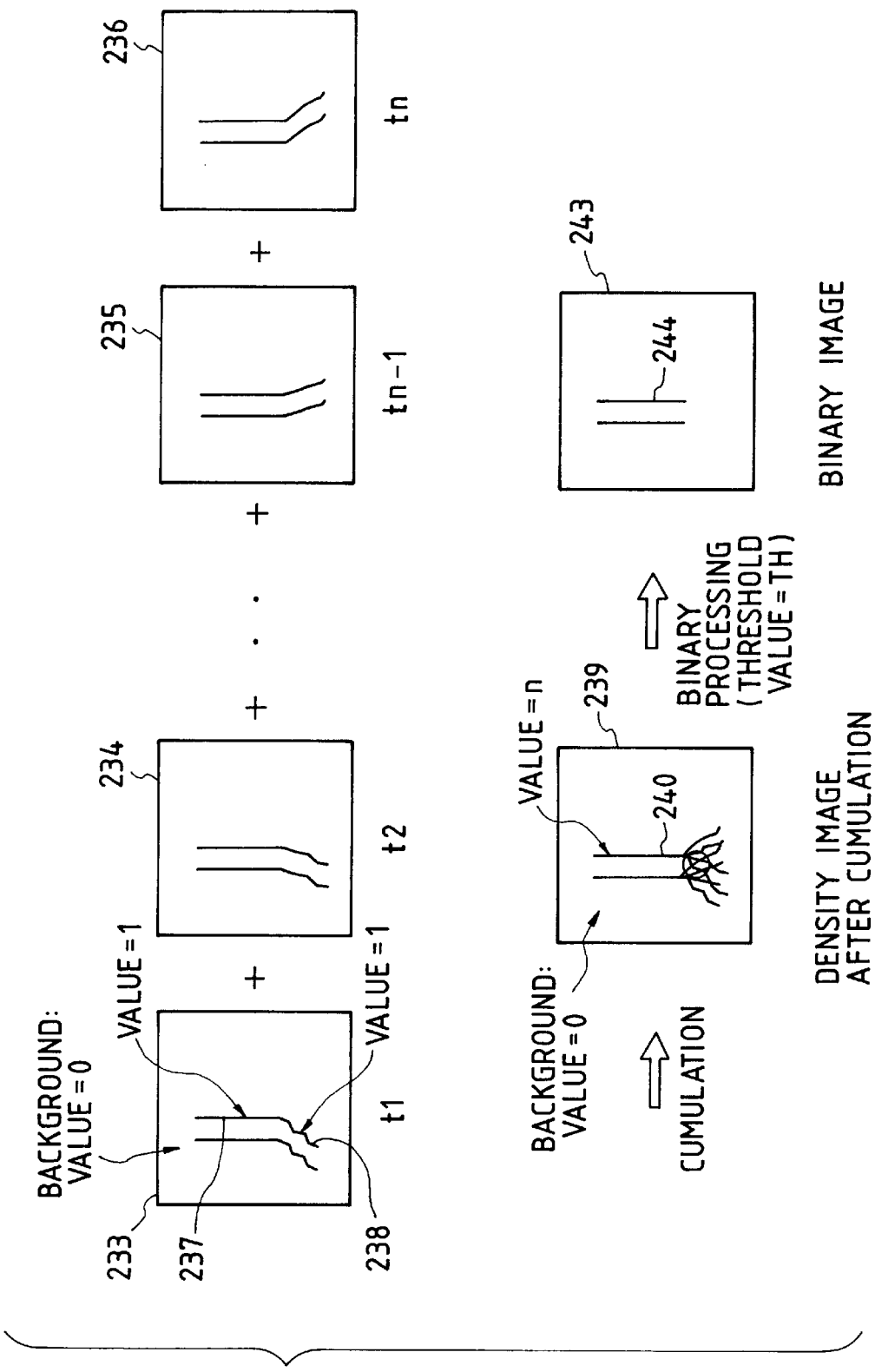

FIG. 29

| ITEMS | CONTENTS DESIGNATED BY OPERATOR |
|---|---|
| 251 — DESIGNATION OF MEASURING TIMES | DESIGNATION OF HOURS<br><br>[FOUR] TIMES PER DAY<br><br>[06] O'CLOCK [00] MINUTES<br>[12] O'CLOCK [00] MINUTES<br>[18] O'CLOCK [00] MINUTES<br>[24] O'CLOCK [00] MINUTES<br>[ ] O'CLOCK [ ] MINUTES<br><br>DESIGNATION OF MINUTES<br><br>[ ] TIMES PER HOUR<br><br>[ ] MINUTES<br>[ ] MINUTES<br>[ ] MINUTES<br>[ ] MINUTES<br>[ ] MINUTES |
| 252 — DESIGNATION OF MEASURING METHODS | FROM [10] O'CLOCK [00] MINUTES TO [16] O'CLOCK [00] MINUTES<br>METHOD 1<br>FROM [16] O'CLOCK [00] MINUTES TO [18] O'CLOCK [00] MINUTES<br>METHOD 2<br>FROM [04] O'CLOCK [00] MINUTES TO [10] O'CLOCK [00] MINUTES<br>METHOD 2<br>FROM [18] O'CLOCK [00] MINUTES TO [04] O'CLOCK [00] MINUTES<br>METHOD 3 |

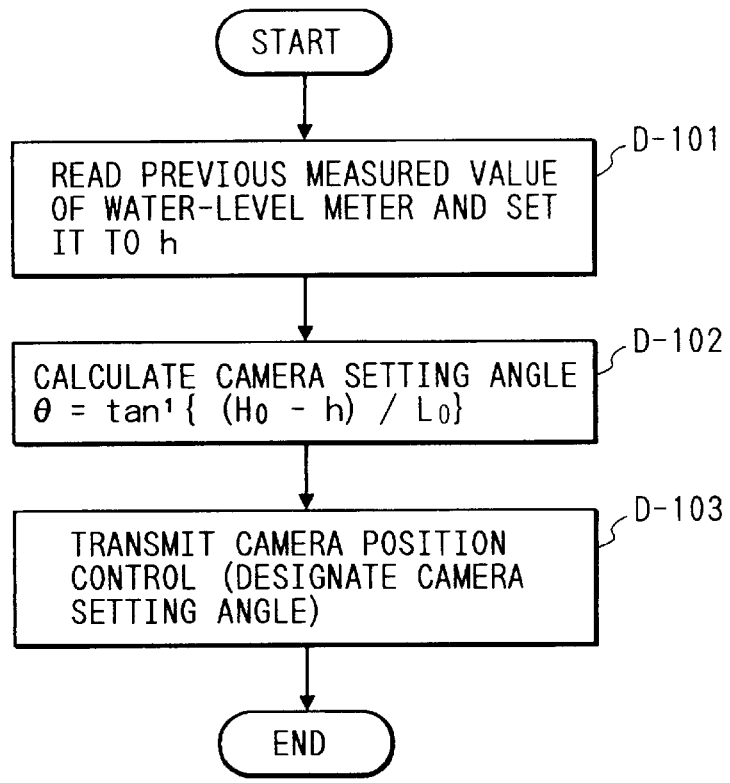
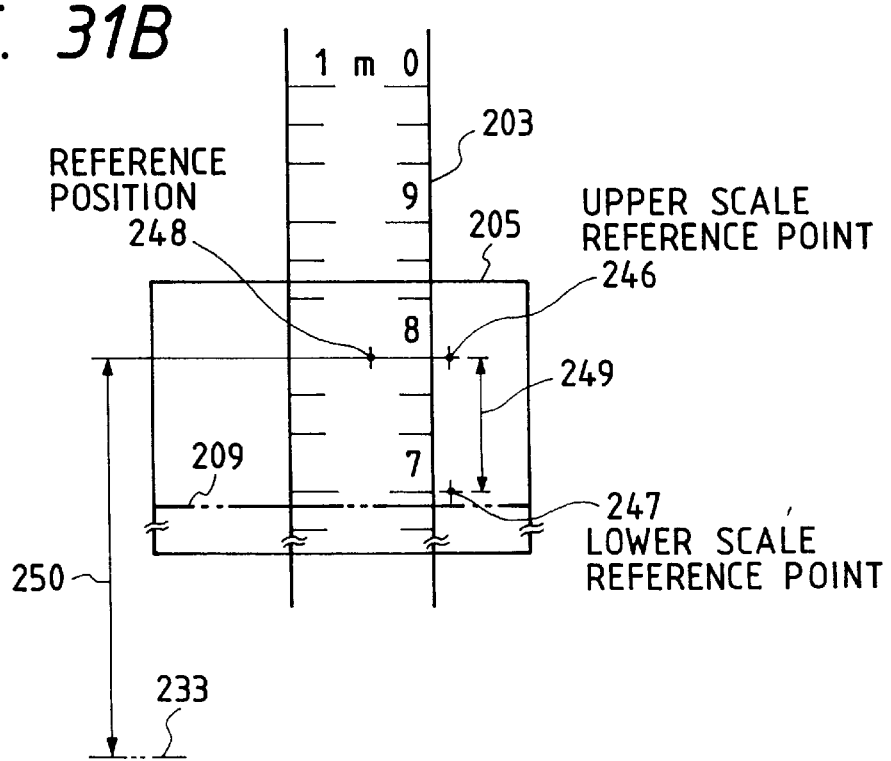

(TIME t)

(TIME t+Δt)

(TIME t)

(TIME t+Δt)

BACKGROUND IMAGE

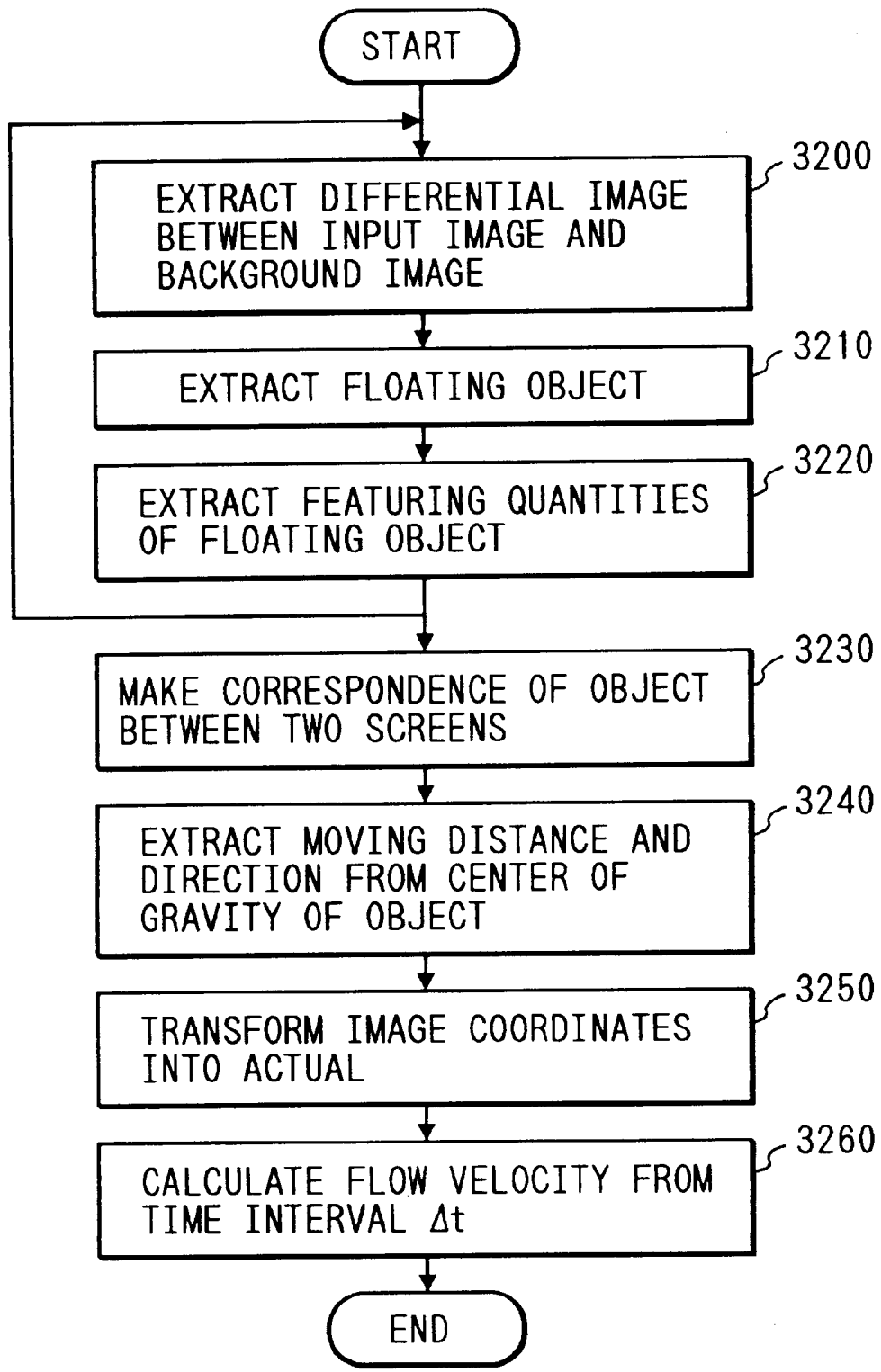

LIQUID-LEVEL POSITION MEASURING METHOD AND SYSTEM

This is a continuation of application Ser. No. 08/857,600 filed May 16, 1997 now abandoned which is a continuation of application Ser. No. 08/480,101, filed Jun. 7, 1995, now abandoned which applications are incorporated herein by reference.

BACKGROUND OF THE INVENTION

The present invention relates to a method of and a system for measuring the level of a liquid surface automatically by an image processing and, more particularly, to a position recognition of the liquid surface in a container such as a tank or of a dam or river by an image.

The measurement of the height of a liquid surface (i.e., the liquid surface) is to measure the distance from the reference horizontal surface to the surface of the liquid. In the prior art, this liquid-level measuring method by measuring a displacement length is divided, as described in Handbook of Mechanical Engineering (6th Edition, 1977 Japanese Mechanical Association, Volume 6 Measuring Method, Section 7-7.6 Measurement of Liquid Level), into a method of measuring the liquid level directly by means of the so-called hook gauge or point gauge and a method of floating a float on the liquid surface to measure the displacement of the float mechanically.

On the other hand, a measurement method by metering the pressure is divided into a method of mechanically or electrically detecting the deformation of a diaphragm attached to the bottom or side face of a tank and a method of inserting a capillary into a liquid to inject compressed air from the capillary tip and thereby measure the back pressure of the capillary.

On the other hand, the measurement of the water level or tide level in a dam, a trough gate or the bank or mouth of a river is generally effected by a method of reading a measuring plate by human eyes. As the mechanical method of measuring the water surface position, there is disclosed in the aforementioned publication a method in which the water is introduced from the river through a tunnel or the like into a well in the ground so that the measurement is effected 1 with a float on the water surface.

The aforementioned mechanical liquid-surface detecting system of the prior art cannot avoid mechanical trouble because a mechanical structure is mounted on or in the water. Hence, the operator is periodically required to be present in order to ascertain that the meter is normal. This requirement conflicts with the need to minimize the patrol in case the site having its liquid surface confirmed is dangerous or remote.

SUMMARY OF THE INVENTION

An object of the present invention is to solve the problem in the liquid-surface measurement by such mechanical measuring means and to provide a liquid-level position measuring method and system which avoids the problems of the prior art and which can lighten the burden upon the operator.

In order to achieve the above-specified object, according to the present invention, the liquid surface is automatically measured by the image processing using the image of a monitor camera in place of the mechanical detection of the prior art. In order to determine the correspondence of the position of the liquid surface with the image, however, various difficulties are caused according to the properties of the liquid. Specifically, a highly viscous liquid is caused to wet the wall surface over the liquid surface by the capillary phenomenon, and it is difficult to decide the position of the liquid surface with the camera image. On the other hand, a highly transparent liquid provides an ambiguous boundary of the liquid surface on the wall surface, and it is difficult to detect the liquid surface with the image.

According to the present invention, therefore, the situation on the side wall and the situation of the liquid surface in the image, as taken by a camera, of the neighborhood of the liquid surface are image-analyzed to estimate the boundary position between the side wall and the liquid surface to thereby determine the position of the surface of the liquid, and the determined liquid-surface position on the image is transformed from the image coordinate system to the real spatial coordinate system to determine the real position of the liquid surface.

Specifically, an oblique straight line is drawn in advance on the wall surface to determine the boundary position between the side wall and the liquid surface on the basis of the positional relation on the image between the straight line image, as taken by the camera, over the liquid and the reflected image of the straight line on the liquid surface.

Moreover, an oblique straight line is drawn in advance on the wall surface to determine the boundary position between the side wall and the liquid surface on the basis of the positional relation on the image between the straight line image, as taken by the camera, over the liquid and the refracted image of the straight line in the liquid or below the liquid surface.

According to the present invention, the oblique straight line drawn in advance on the wall surface is used, and the coordinates of the intersection between the reflected shadow of the straight line and the straight line over the liquid surface are determined on the image so that the position of the liquid surface is determined on the basis of the intersection. As a result, even if the liquid has a low transparency but a considerable surface reflectivity, the position of the liquid surface can be determined by the image processing.

According to the present invention, moreover, the oblique straight line drawn in advance on the wall surface is used, and the coordinates of the intersection between the image of the straight line below the liquid surface and the straight line over the liquid surface are determined on the image so that the position of the liquid surface is determined on the basis of the intersection. As a result, even if the liquid has a high transparency, the position of the liquid surface can be determined by the image processing.

According to the present invention, when the image of a measuring plate disposed vertically with respective to the water surface is inputted and subjected to a predetermined image processing to measure the water level, the images of the measuring plate are inputted in time series, and the densities of the individual input images are horizontally or obliquely differentiated (to form differential images) and cumulated to form a cumulative density image so that the measuring plate and the water surface are separated by the density difference of the cumulative density image to recognize the water surface position. Alternatively, each time a plurality of images of the measuring plate are inputted in time series, these input images are difference-processed (to form difference images) and cumulated to form a cumulative density image so that the measuring plate and the water surface are separated by the density difference of the cumulative density image to recognize the water surface position.

According to the present invention, each time a plurality of images of the measuring plate are inputted in time series, at first these input images and then the input images and a cumulative density image are maximized and cumulated to form the cumulative density image so that the measuring plate and the water surface are separated by the density difference of the cumulative density image to recognize the water surface position.

According to the present invention, each time a plurality of images of the measuring plate are inputted in time series, at first these input images and then the input images and a cumulative density image are minimized and cumulated to form the cumulative density image so that the measuring plate and the water surface are separated by the density difference of the cumulative density image to recognize the water surface position.

According to the present invention, in a method of measuring a water level by inputting the images of the measuring plate disposed vertically with respect to the water surface in series and by subjecting the input images to a predetermined image processing, each time the images of the measuring plate are inputted, these input images or the input images and a cumulative density image are subjected to the predetermined image processing (to form a processed image) and cumulated to form the cumulative density image, and the cumulative density image, which is formed by repeating the processings by predetermined number of times, is made binary to recognize the water surface position in the measuring plate image. At the same time, the predetermined image processing is selected according to a predetermined condition from either the differentiating processing to determine the density change of the input images in a predetermined direction or a difference processing to determine the difference in the density between the input images, the maximizing processing to determine the maximum in the density between the input image and the cumulative density image, or the minimizing processing to determine the minimum in the density between the input image and the cumulative density image.

According to the present invention, in case the water level is to be measured by inputting the image of a measuring plate disposed vertically with respect to the water surface and the image of a sub-measuring plate disposed obliquely with respect to the water surface, the following method is selectively used according to the measuring environmental conditions: (a) the vertical plate method in which each time the images of the measuring plate are inputted in time series, these input images or the input images and a cumulative density image are subjected to the predetermined image processing (to form a processed image) and cumulated to form the cumulative density image, and the cumulative density image, which is formed by repeating the processings by a predetermined number of times, is made binary with a predetermined density threshold value to recognize the water surface position in the measuring plate image; and (b) the oblique plate method in which the water surface position is recognized by inputting the image of the sub-measuring plate and by determining the intersection between the real image of the sub-measuring plate and the mapped image by the water surface.

In the method of measuring the water level, in which a camera for inputting the images of the measuring plate disposed vertically with respect to the water surface in series is used to measure the water level by subjecting the input images to a predetermined image processing, the numeral corresponding to a predetermined graduation indicated in the image of the measuring plate is read at the setup time and is latched as a reference position numeral, and all the numerals are read at the measuring time from the image of the measuring plate. In case the reference position numeral cannot be recognized, the reference position numeral, which is latched as the median of all the numerals or the neighborhood value of the median, is updated. Moreover, the visual angle of the camera is controlled according to the fluctuation of the water level.

According to this construction, the measuring plate, which is disposed vertically with respect to the water surface, is sliced at first from the input image thereof so that the memory and numeral for the reference position are read out. Then, the input image is subjected to a predetermined image processing to recognize the water surface boundary. Finally, the water level (or latitude) of the recognized water surface boundary is calculated on the basis of the reference position. Incidentally, in the case of still water, the real image and the mapped image (e.g., the reflected image or the refracted image) of the measuring plate are joined on the image of the measuring plate normal to the water surface, to make it difficult to recognize the water surface boundary position. Therefore, the image of the oblique measuring plate is inputted to determine the water surface boundary position from the intersection between the real image and the mapped image. In the case of flowing water, on the other hand, the mapped image fluctuates to make it difficult to recognize the water surface boundary by the oblique plate method. According to the present invention, a plurality of input images are processed by making use of the time displacement of the mapped image due to the fluctuation of the surface of the moving water to erase the mapped image so that the water surface boundary position is recognized by extracting the measuring plate over the water surface.

The remaining objects and other features of thee present invention will become more apparent from the description to be made in the following.

BRIEF DESCRIPTION OF THE DRAWINGS

FIG. 21 is an explanatory diagram showing a processing assumption of the differentiating method;

FIG. 29 is an explanatory diagram presenting the items of a scheduler according to one embodiment of the present invention;

FIG. 30 is a flow diagram for explaining a method of controlling the position of an image taking camera for the water-level measurement according to one embodiment of the present invention;

FIGS. 31A and 31B present diagrams for explaining the setup procedure according to one embodiment of the present invention;

FIGS. 34A, 34B and 34C are explanatory diagrams of a procedure for measuring the flow direction by using a float or the like;

FIG. 35 is a flow chart showing the processing flow for measuring the flow direction by using the float or the like;

FIG. 37 is a flow chart showing the processing flow for measuring the flow-direction/flow-velocity by using the floating object.

DETAILED DESCRIPTION

Figure 1:
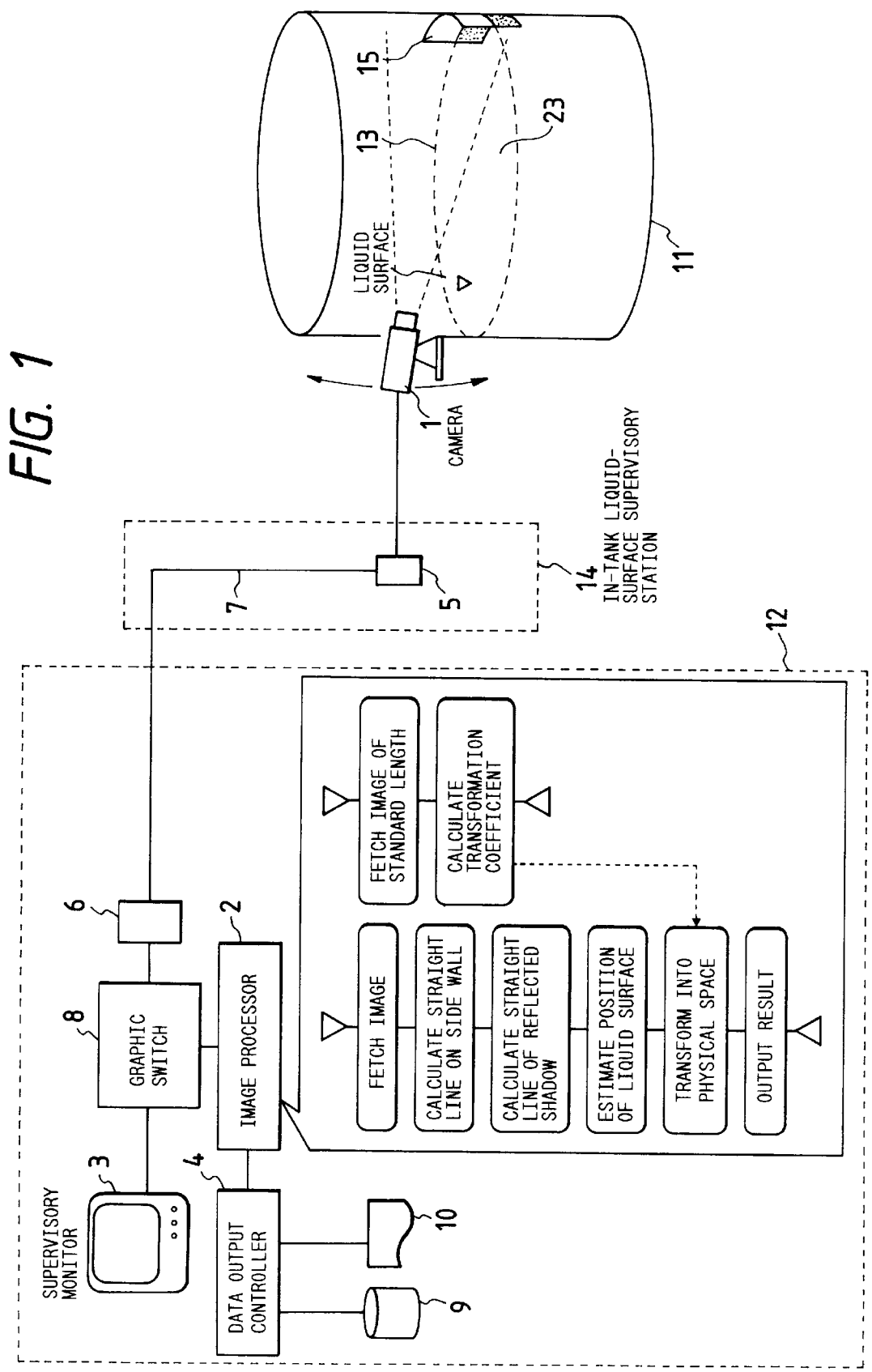
FIG. 1 is a diagram showing the entire construction of a system according to one embodiment of the present invention.

FIG. 1 schematically shows the entire construction of a liquid-surface position measuring system and its measuring principle according to one embodiment of the present invention. Here will be described a system for monitoring a liquid surface 23 in a tank 11, for example, but the present invention can also be applied to another system for monitoring the surface of a liquid contained in an artificial container or a liquid existing in the natural world. A camera 1 takes the image of a side wall portion 15 of the tank 11 to be monitored, and the taken image is transmitted through an electro-optical converter 5 of an in-tank liquid-surface supervisory station 14 and an optical cable 7 to an in-tank liquid-surface supervisory center station 12. In this in-tank liquid surface supervisory center station 12, a photo-electric converter 6 converts the received image into electric signals and transfers them to a graphic switch 8. In this graphic switch 8, the image signals are distributed between a supervisory monitor 3 and an image processor 2. The supervisory monitor 3 is a display for the operator to monitor. In the image processor 2, the position of the liquid surface is automatically measured by the image processing method of the present invention, and the measurement result is transferred to a data output controller 4. With the construction described above, the situation of the liquid surface in the tank at the site can be automatically measured by the image processor 2 without use of any mechanical meter so that it can be latched in a database 9 by the data output controller 4, outputted as a hard copy by a printer 10 or sent or provided to a necessary station. The most prominent feature of the present invention is to detect the position of the liquid surface through the image, as will be described in detail in the following.

Figure 2:
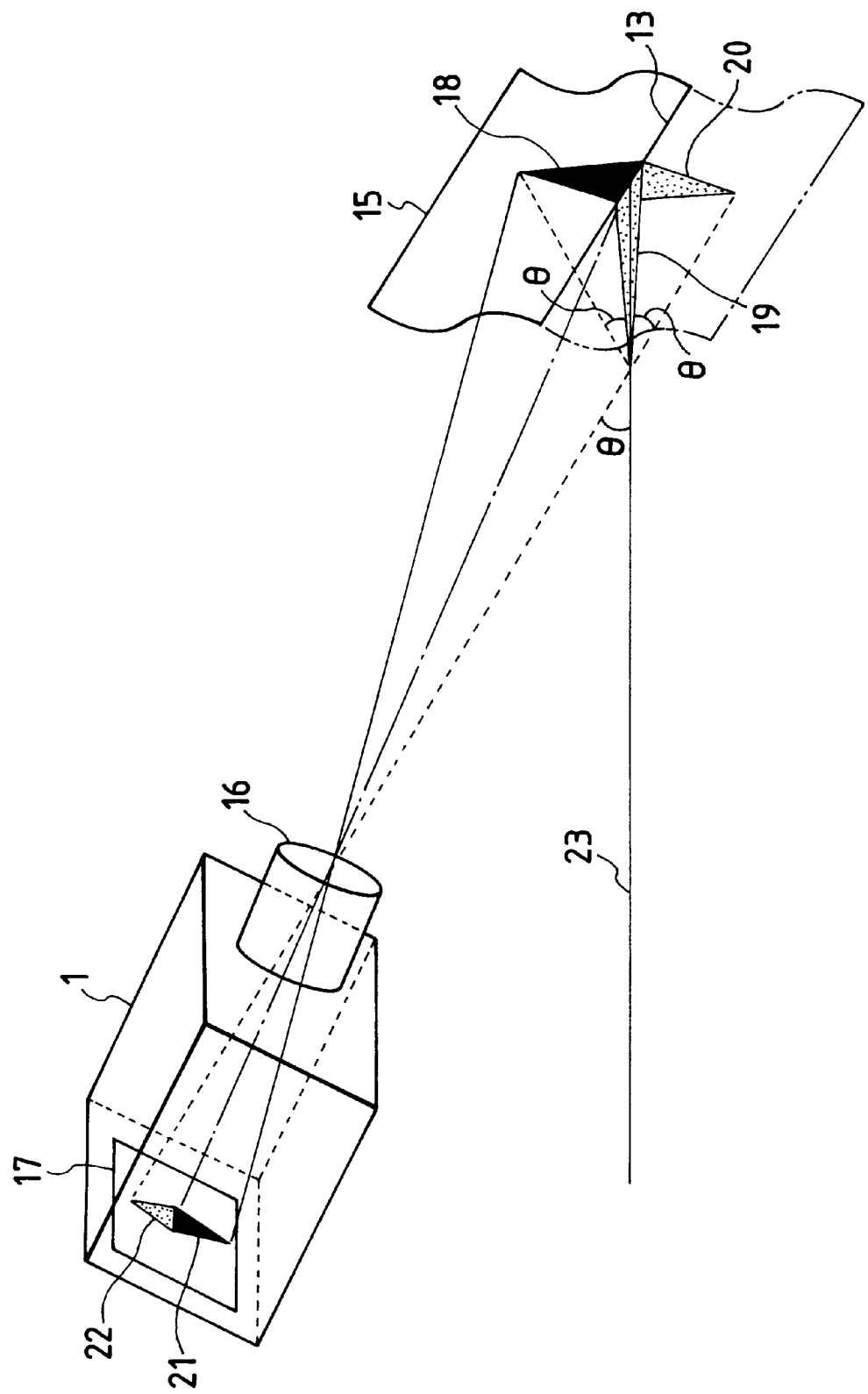
FIG. 2 is an explanatory diagram showing the principle of appearance of an image which is created below the liquid surface by the reflection from over the liquid surface.

FIG. 2 shows how an object 18 of the taken wall surface portion 15 in the vicinity of the object to be imaged, in the case wherein the liquid has a highly reflective surface, and a reflected shadow 19 on the liquid surface are to be taken on an image pickup plate 17. As viewed from the camera side, the reflected shadow 19 of the object 18 on the liquid surface is created, as shown in FIG. 2, in the geometrical relation to the lens 16 of the camera. The reflected shadow 19 is so seen from the camera side as is equivalent to the image 20 which is just opposite to the object 18. The object 18 and the image 20 have the identical shapes, and this feature is utilized in the present invention. The image of the object 18 on the image pickup plate is designated at 21, and the image of the image 20 on the image pickup plate is designated at 22. It should be noted that the images 21 and 22 have equal sizes. At the time of monitoring the liquid surface, it is desired but generally difficult to recognize a boundary 13 between the liquid surface and the side wall directly from the camera image. For this difficulty, there are a variety of reasons, the major ones of which arise from the capillary phenomenon and the transparency of the liquid. Due to the capillary phenomenon, the liquid will rise along the side wall in the vicinity of the boundary 13 so that the portion wetted with the liquid is liable to absorb the light and to change its color to black. As a result, the boundary portion turns into black in its entirety so that it cannot be recognized in the least from the image. If, moreover, the liquid has an intense transparency even if such phenomenon would not be likely to occur, the boundary 13 between the side wall 15 and the liquid surface 23 can hardly be recognized from the image.

Figure 3:
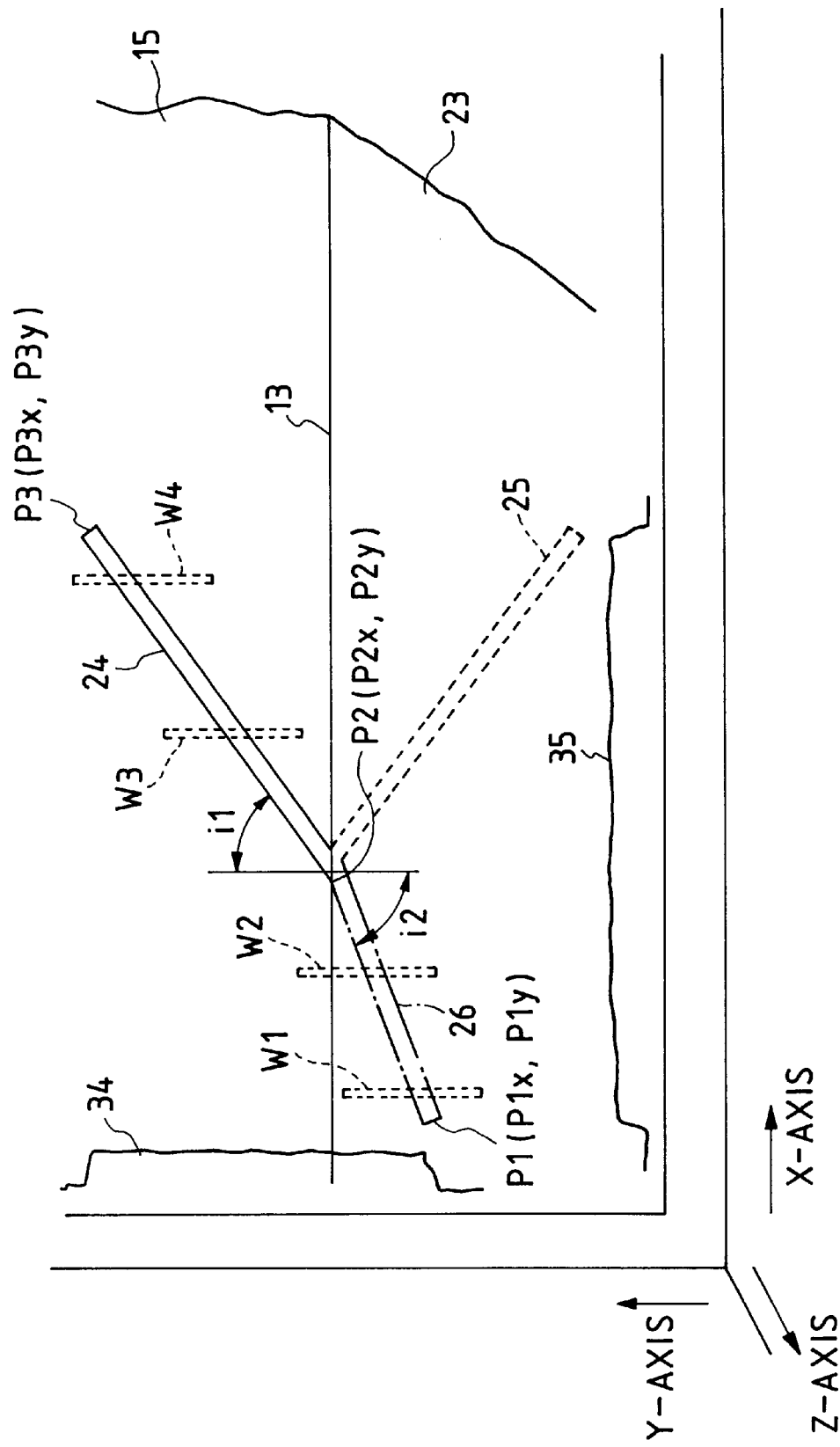
FIG. 3 is an explanatory diagram of a method utilizing an oblique straight line (in case the liquid has a high transparency)

FIG. 3 shows an example of the image of the vicinity of the boundary between the liquid surface and the wall surface in case a straight line (or segment) 24 is so drawn on the wall surface that the height of the surface of such liquid may be recognized by the image processing. In the present embodiment, the liquid is so highly transparent that the straight line portion below the liquid surface can be taken as a refracted image 26 on the camera, and this image is so excellent that it can be processed. A refracted shadow 25 of the segment 24, as seen over the liquid surface and taken on the liquid surface, may be taken on the image. In this case, however, due to a low reflectivity, there is hardly obtained such an excellent image as can be recognized by the image processing.

Figure 4:
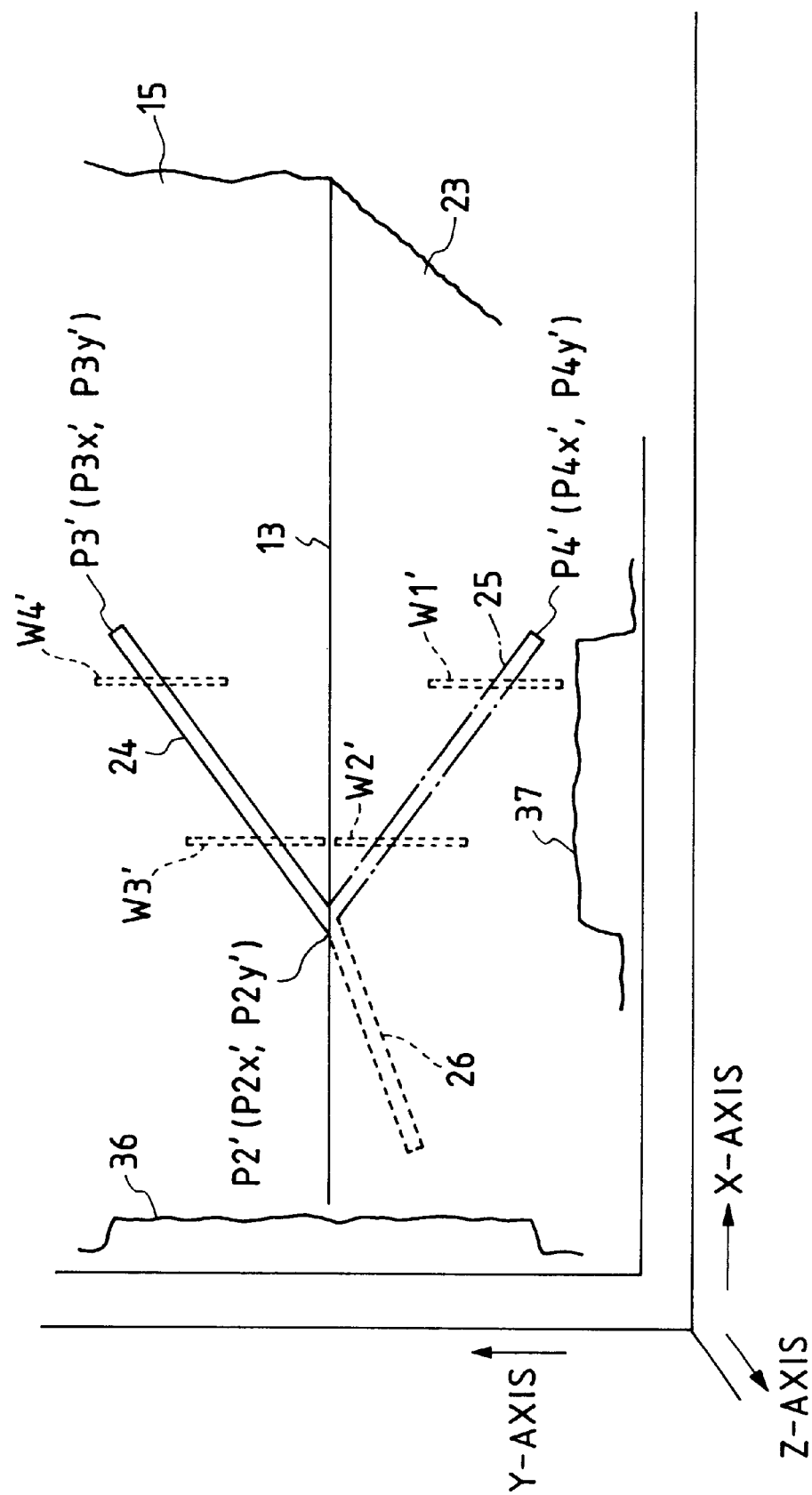
FIG. 4 is an explanatory diagram of a method utilizing an oblique straight line (in case the liquid has a low transparency but a high surface reflectivity)

FIG. 4 shows an example of the case of a low transparency and a high surface reflectivity, as contrary to the example of FIG. 3. In this example of FIG. 4, the refracted image 26 below the liquid surface is not an excellent image, but the reflected shadow 25, as reflected on the liquid surface, of the segment over the liquid surface is an excellent image. Both FIGS. 3 and 4 present the cases in which the boundary 13 between the liquid surface 13 and the side wall 15 cannot be directly recognized as the image due to the capillary phenomenon. The position of the boundary can be estimated by skillfully using the image 26 in the case of FIG. 3 and the image 25 in the case of FIG. 4.

Figure 5:
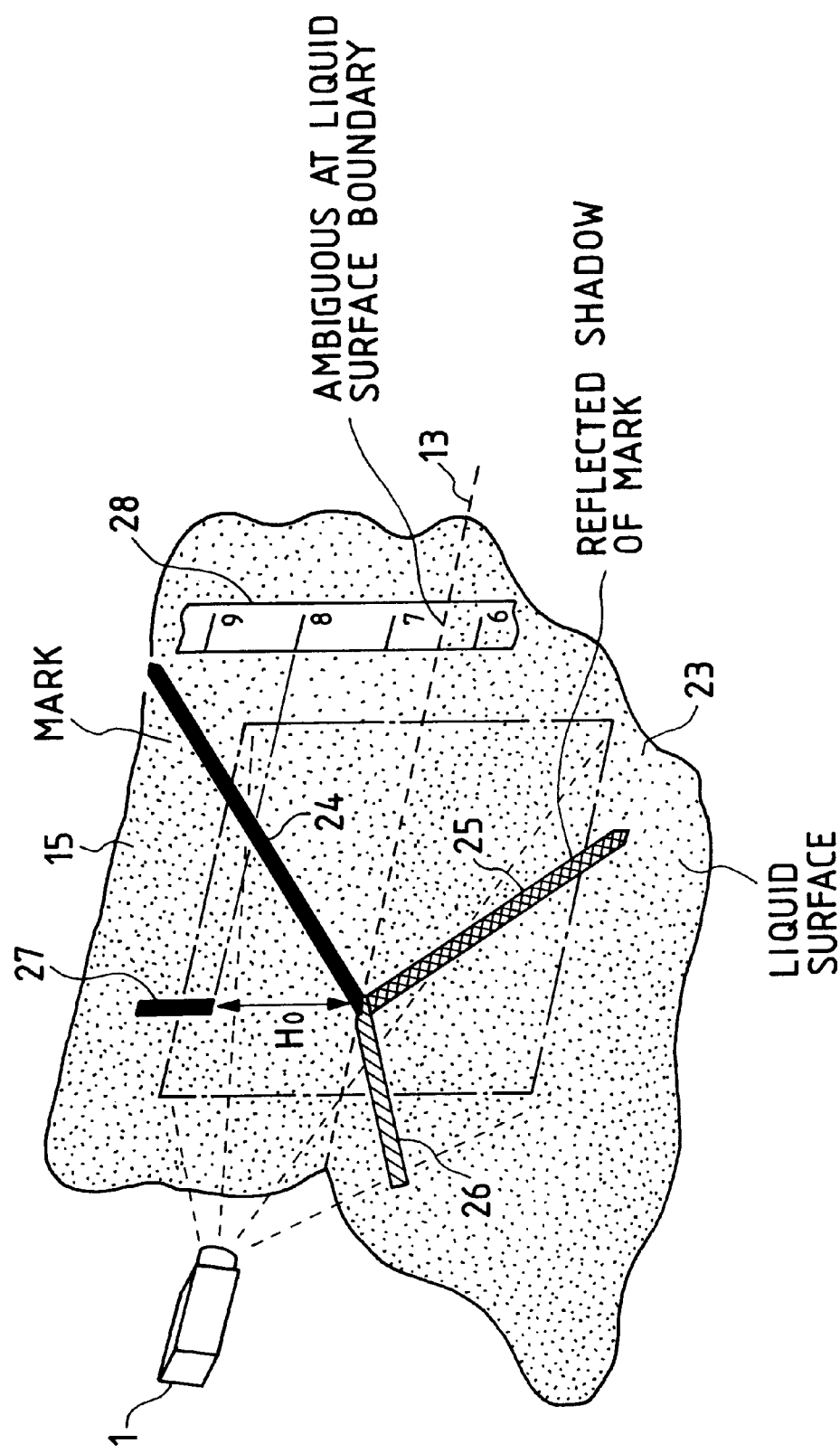
FIG. 5 is an explanatory diagram of a method utilizing the reflected shadow of the inclined straight line on the surface.

FIG. 5 shows one embodiment for estimating the level of the liquid surface by drawing the inclined straight line 24 on the wall surface 15 and by using the refracted image 26 and the reflected shadow 25 on the liquid surface 23. Numeral 27 designates a reference mark which is drawn in advance on the wall surface (or on the scale) for transforming the size of the image on the image coordinates into that in the real spatial coordinate system. Here, it is assumed that the reference mark is attached to have a height of $Y_1$ mm (i.e., a vertically elongated rectangle). It is further assumed that the reference mark has its lower or upper end positioned to coincide with a specific memory on a reference scale 28 for measuring the liquid surface (that is, the lower end is positioned to coincide with the position of 8 cm in FIG. 5). Thanks to these assumptions, the comparison with the reference can be easily carried out by the image processing, so that the position of the liquid surface can be easily calculated by the real spatial coordinate system immediately as the boundary position is detected.

Figure 6:
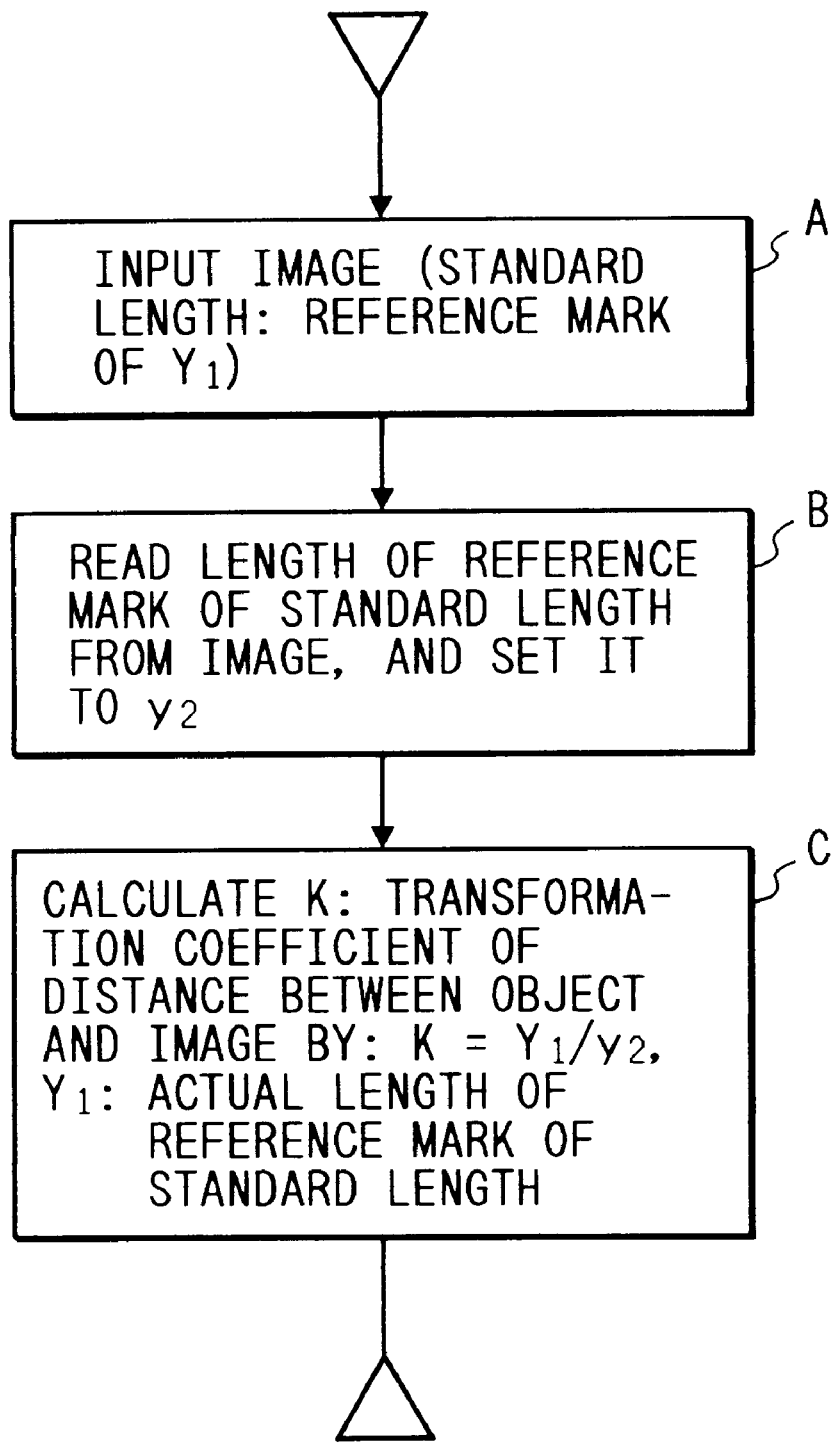
FIG. 6 is a flow chart for determining a transformation coefficient between the length of a real object and the length in the image.

With reference to FIG. 6, here will be described a method of determining a coefficient of transformation between the image coordinate system and the real spatial coordinate system. First of all, an image containing the reference mark having a standard length (Y1 mm) is fetched (as in Block A). Next, the image of the reference mark portion of the standard length is processed to measure its length $y_2$ in the image coordinates (as in Block B). Finally, a transformation coefficient K is calculated by the following equation (as in Block C):

$$K = Y1/y2.$$

The transformation coefficient K need not be calculated at all times but may be once calculated and latched, and is calculated again when the condition changes or when the storage is lost. As a result, there arises no problem even if the mark is partially or wholly submerged in the water for a while.

Figure 7:
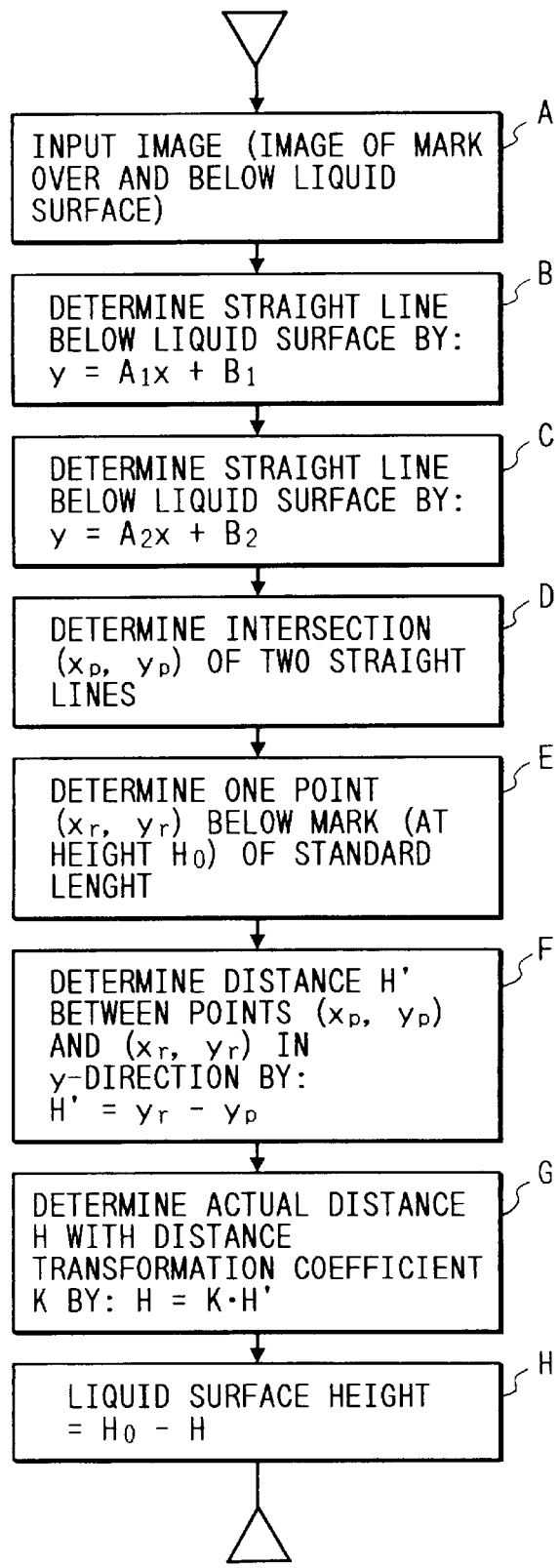
FIG. 7 is a flow chart for measuring the liquid surface height by utilizing the refracted image of the straight line below the liquid surface.
Figure 9:
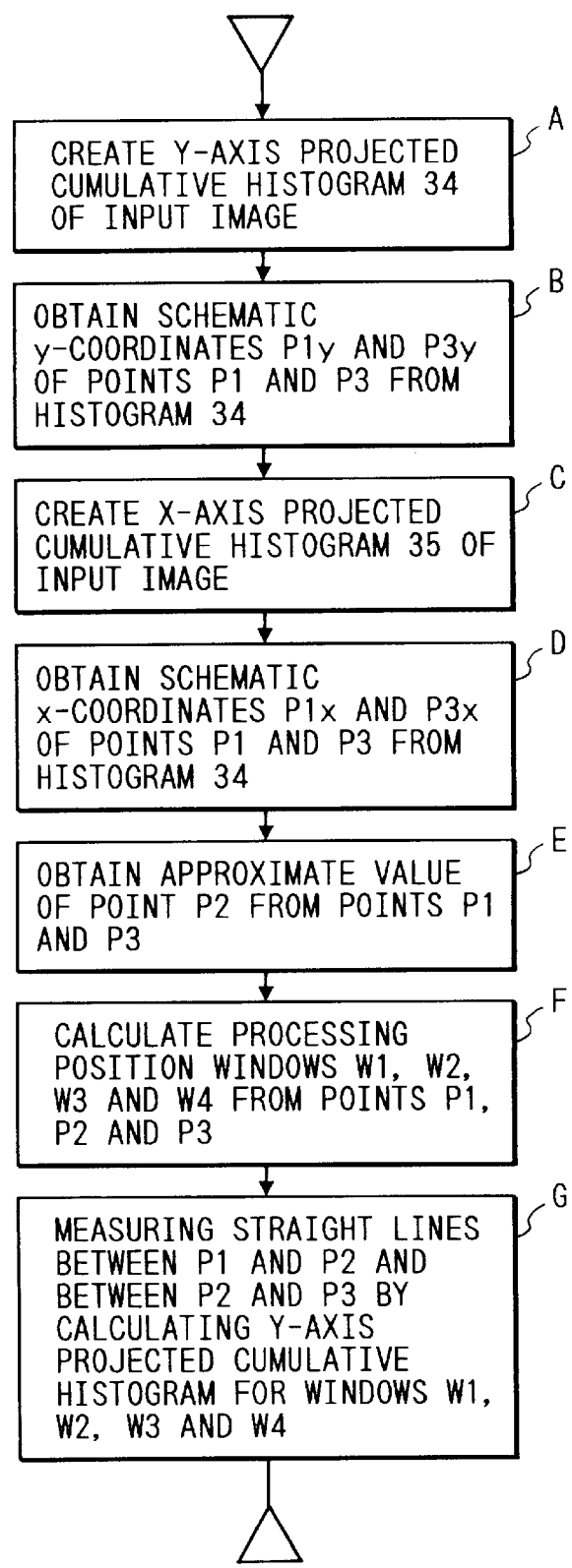
FIG. 9 is a processing flow chart for determining the straight lines and their intersection.

With reference to FIGS. 3, 7 and 9, here will be described the embodiment in which the liquid has an excellent transparency. This case is characterized in that the refracted image 26 of the straight line below the liquid surface is clear whereas the reflected shadow 25 on the liquid surface is not clear, as shown in FIG. 3. Therefore, the straight line 24 and the refracted image 26 are processed to estimate the height of the liquid surface. The straight line 24 over the liquid and the refracted image 26 below the liquid are shown in FIG. 3, as folded by the refractivity of the liquid. This characteristic is utilized. Here will be described a method of determining the liquid surface position 13 as an intersection between the straight line 24 over the liquid surface and the refracted straight line 26 below the liquid surface, as shown in FIG. 7. First of all, the image is fetched (as in Block A) to determine the straight line (or segment) 24 over the liquid surface. The determined straight line is defined by the following equation (as in Block B):

$$y = A1*x + B1.$$

The refracted straight line 26 below the liquid surface is determined. The determined straight line is defined by the following equation (as in Block C):

$$y = A2*x + B2.$$

The intersection (xp, yp) of the two straight lines is determined from the following equation (as in Block D):

$$xp = \frac{\begin{vmatrix} 1 & B1 \\ 1 & B2 \end{vmatrix}}{\begin{vmatrix} 1 & -A1 \\ 1 & -A2 \end{vmatrix}}, yp = \frac{\begin{vmatrix} B1 & -A1 \\ B2 & -A2 \end{vmatrix}}{\begin{vmatrix} 1 & -A1 \\ 1 & -A2 \end{vmatrix}}$$

Moreover, the position (xr, yr) of the reference mark of the standard length is determined on the image (as in Block E). The difference in the Y-direction between the position (xr, yr) of the reference mark of the standard length and the intersection (xp, yp) is calculated by the following equation (as in Block F):

$$H' = yr - yp.$$

The actual distance H between the reference mark of the standard length and the intersection is determined with the distance transformation coefficient K by the following equation (as in Block $$H = K \cdot EH'.$$

Since the height ($H_0$) of the reference mark of the standard length is known, the height of the liquid surface is calculated by the following equation (as in Block H):

$$\text{Liquid Surface Height} = H_0 - H.$$

With reference to FIG. 9, here will be described in detail the method of determining the intersection between the straight line 24 and the straight line 26 by processing the image. In FIG. 3, the straight line 24 has its upper end at P3, and the segment 26 has its lower end at P1. The intersection of these straight lines is designated at P2. This intersection can be easily determined if the two straight lines are determined. The segment 24 is determined by the image processing such that two windows W3 and W4 are formed on the segment to calculate the Y-axis projected cumulative histogram to thereby achieve the position of the intersections between the windows and the straight line. The straight line 24 can be made highly accurate by joining the two points, which are obtained by the histogram calculation in the two windows, through the straight line. Likewise, the straight line 26 can be determined by forming two windows W1 and W2 thereon, by calculating the Y-axis projected cumulative histogram in the windows to form two intersections between the windows and the straight line, and by joining the two intersections through the straight line. Since the straight line 26 and the intersection P2 change with the change in the surface of the liquid, the summary of the two segments have to be known before the four windows are created. This processing procedure will be described in the following with reference to FIG. 9. First of all, a Y-axis projected cumulative histogram 34 is created for the entirety of the input image (as in Box A). Since this histogram 34 is significantly changed at the Y-axis projected portion between the points P1 and P3 by the influences of the straight lines 24 and 26, the schematic y-coordinates P1y and P3y of the points P1 and P3 are easily obtained (as in Box B). Next, the an X-axis projected cumulative histogram 35 is created for the entirety of the input image (as in Box C). Since this histogram 35 is significantly changed at the X-axis projected portion between the points P1 and P3 by the influences of the straight lines 24 and 26, the schematic x-coordinates P1x and P3x of the points P1 and P3 are easily obtained (as in Box D). The approximate values of the point P2 are obtained from those of the points P1 and P3, as follows. The straight line 24 extends through the point P3 (P3x, P3y) and has an angle i1 with respect to the Y-axis. If the gradient is indicated by K24, it is expressed by the following equation:

$$K24 = \tan(90 - i1),$$

wherein the angle i1 is known.

On the other hand, the straight line 26 extends through the point P1 (P1X, P1y) and has an angle i2 with respect to the Y-axis. If the gradient is indicated by K26, it is expressed by the following equation:

$$K26 = \tan(90 - i2),$$

wherein the angle i2 is decided from the refractive index n of the liquid and the angle i1.

The following relation holds from Snell's law if the liquid has the refractive index N:

$$n = \sin(i2)/\sin(i1).$$

Since the values i1 and n are known, the value i2 is also known. Hence, the gradients of the two straight lines 24 and 26 are known.

Thus, the straight line 24 is expressed by the following equation:

$$y - P3y = K24(x - P3x);$$

or $$y - K24 * x = P3y - K24 * P3x.$$

The straight line 26 is expressed by the following equation:

$$y - P1y = K26(x - P1x);$$

or $$y - K26 * x = P1y - K26 * P1x.$$

The intersection of the two straight lines is located at the point P2, as expressed by the following equations:

$$P2x = \frac{\begin{vmatrix} 1 & P3y - K24*P3x \\ 1 & P1y - K26*P1x \end{vmatrix}}{\begin{vmatrix} 1 & -K24 \\ 1 & -K26 \end{vmatrix}}$$

and $$P2x = \frac{\begin{vmatrix} P3y - K24*P3x - K24 \\ P1y - K26*P1x - K26 \end{vmatrix}}{\begin{vmatrix} 1 & -K24 \\ 1 & -K26 \end{vmatrix}}$$

wherein:
 (P1x, P1y) and (P3x, P3y):
  Coordinates of Points P1 and P3;
 K24tan(90−i1)
  (wherein i1: Known Angle between Straight Line 24 and Y-Axis);
 and
 K26=tan(90−i2)
  (i2=sine (n*sin(i1)))
  (n: Known Refractive Index of Liquid).

The aforementioned coordinates (P2x, P2y) of the point P2 are rather approximate values and do not give the accurate position of the liquid surface. In order to measure the accurate position of the liquid surface, the windows W1, W2, W3 and W4 are created on the straight lines by using the approximate positions of the aforementioned points P1, P2 and P3, and the equations expressing the individual straight lines are achieved by creating the histograms in the individual two sets of windows to determine the intersections between the windows and the straight lines and by joining the two intersections through the straight lines. The procedure for creating the windows W3 and W4 on the straight line 24 will be described in the following. Since the approximate coordinates of the two ends P2 and P3 of the segment 24 are known, this segment may have its suitable internally divided points calculated to create the two windows at those points. For example, the segments P2 and P3 are equally divided into four to have their internally divided points designated at Pn1, Pn2 and Pn3 sequentially from the left. Then, the window W3 may be placed at the point Pn1, and the window W4 may be placed at the point Pn3.

In this case, the windows have the following coordinates:
 Coordinates of the window W3 (W3x, W3y):

$$W3x = (3*P2x + P3x)/4,$$

and $$W3y = (3*P2y + P3y)/4;$$

and
 Coordinates of the window W4 (W4x, W4y):

$$W4x = (P2x + 3*P3x)/4,$$

and $$W4y=(P2y+3*P3y)/4.$$

Likewise, the windows W1 and W2 have to be created on the straight line 26. The creating procedure is similar to the aforementioned one. In this case, the windows have the following coordinates:

Coordinates of the window W1 (W1x, W1y):

$$W1x=(3*P1x+P2x)/4,$$

and $$W1y=(3*P1y+P2y)/4;$$

and

Coordinates of the window W2 (W2x, W2y):

$$W2x=(P1x+3*P2x)/4,$$

and $$W2y=(P1y+3*P2y)/4.$$

Thus, the two windows are created on each of the two straight lines. If the Y-axis projected cumulative histogram is created in each window, it significantly changes at the intersection with the straight line so that the intersection between the window and the straight line is located. The straight line has a thickness in this case so that both its two upper and lower edge portions are formed. In this case, only the information of the upper edge portion is used while omitting the information of the lower edge portion. The intersections between the windows W1, W2, W3 and W4 and the straight lines are given by the Y coordinates of W1y, W2y, W3y and W4y.

The straight line 24 is given by the following equation, as joins the windows (W3x, W3y) and (W4x, W4y):

$$y=(W4y-W3y)(x-W3x)/(W4x-W3x)+W3y.$$

The straight line 26 is given by the following equation, as joins the windows (W1x, W1y) and (W2x, W2y):

$$y=(W1y-W2y)(x-W2x)/(W1x-W2x)+W2y.$$

Figure 8:
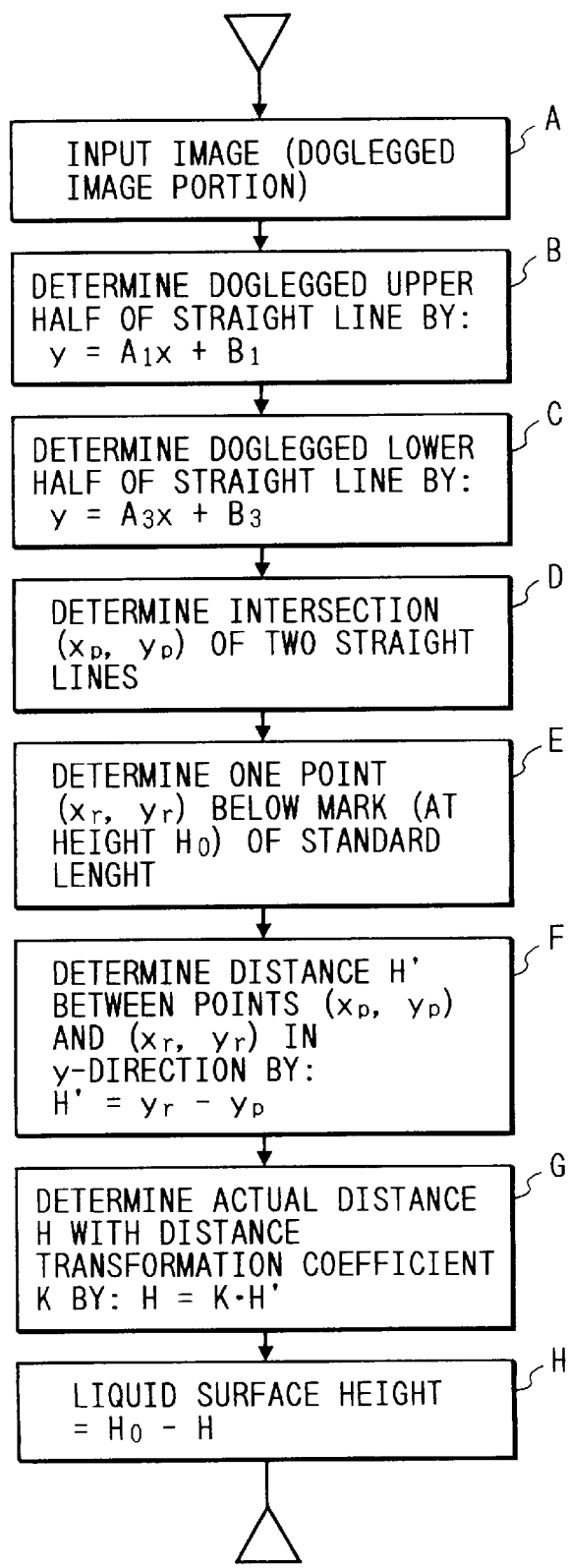
FIG. 8 is a flow chart for measuring the liquid surface height by utilizing the reflected shadow of the straight line over the liquid surface.
Figure 10:
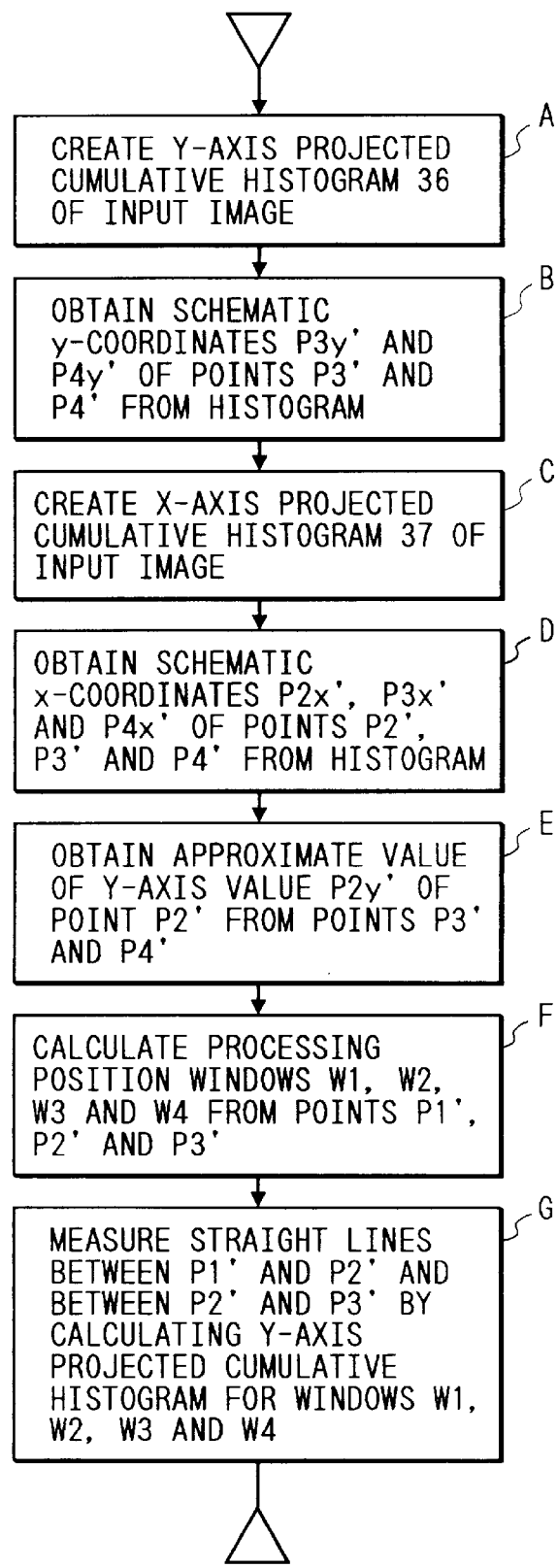
FIG. 10 is a processing flow chart for determining the straight lines and their intersection.

Next, with reference to FIGS. 4, 8 and 10, there will be described the case, in which the liquid has a low transparency but a relatively highly reflective surface, in connection with an embodiment using the reflected shadow 25 of the straight line 24 on the liquid surface. This case is characterized, as shown in FIG. 4, in that the refracted image 26 of the straight line below the liquid surface is not clear whereas the reflected shadow 25 on the liquid surface is clear. Hence, the reflected image 25 has its image processed to estimate the liquid surface height. The straight line 24 over the liquid and the reflected image 25 are symmetric with respect to the liquid surface position 13, as shown in FIG. 4. This characteristic is utilized. There is either a method of determining the liquid surface position 13 as the intersection between the straight line 24 over the liquid surface and the straight line 25 of the reflected image over the liquid surface, or a method of calculating the Y-coordinates on the two straight lines at positions having identical X-coordinates to determine the liquid surface position from the median of the Y-coordinates. Either of these methods may be suitable, both from the standpoint of feasibility of the processing or the high accuracy. Here will be described in detail the method of determining the intersection of the two straight lines with reference to FIG. B. First of all, the image is fetched (as in Box A) to determine the upper straight line 24 (as in Box B). Next, the straight line 25 of the lower reflected image is determined (as in Box C). The intersection (xp, yp) of the two straight lines is determined (as in Box D). Moreover, the position (xr, yr) of the reference mark of the standard length is determined on the image (as in Box E). The difference in the height between the intersection (xp, yp) and the position (xr, yr) of the reference mark of the standard length is calculated (as in Box F) to determine the actual distance H with the distance transformation coefficient K (as in Box G). Since the height (H.) of the reference mark of the standard length is known, the liquid surface height is calculated as $(H_0-H)$ (as in Box H).

Here will be described in detail how to determine the intersection between the segment 24 and the segment 25 with reference to FIG. 10. In FIG. 4, the segment 24 has an upper end P3', and the segment 25 has a lower end P4'. These two segments has an intersection at P2'. This intersection P2' can be easily determined if the two straight lines are obtained. The segment 24 can be achieved by the image processing such that the two windows W3' and W4' are created on the segment to calculate the Y-axis projected cumulative histogram in the windows. The highly accurate straight line 24 can be achieved by joining the two points which are obtained by the histogram calculation in the two windows. The segment 25 is likewise obtained by creating two windows W1' and W2' on the segment 25. Since the intersection P2' changes with the change in the surface of the liquid, the summaries of the two straight lines have to be known in advance before the four windows are created. This processing procedure will be described in the following with reference to FIG. 10. First of all, a Y-axis projected cumulative histogram 36 is created for the entirety of the input image (as in Box A). Since this histogram 36 is greatly changed in the Y-axis projected portion of the points P3' and P4' by the influences of the segment 24 and the segment 25, the points P3' and P4' have their schematic y-coordinates P3y' and P4y' determined (as in Box B). Next, an X-axis projected cumulative histogram 37 is created for the entirety of the input image (as in Box C). Since this histogram 37 is highly changed in the X-axis projected portion of the points P2' and P3' by the influences of the segment 24 and the segment 25, the points P2' and P3' have their schematic x-coordinates P2x' and P3x' determined (as in Box D). The coordinate P4x' is identical to the coordinate P3x'. The Y-coordinate of the point P2' is obtained as the median of the Y-coordinates of the points P3' and P4', as follows:

$$P2y'=(P3y'+P4y')/2.$$

As described above, there are obtained all the approximate values of the coordinates P2' (P2x', P2y'), P3' (P3x', P3y') and P4' (P4x', P4y').

In order to determine the segments 24 and 25 more accurately, two windows W3' and W4' are created on the segment 24. Since the two ends P2' and P3' of the segment 24 are known, they can be easily used to create the windows on the segment 24. If the segment 24 is divided by four equally dividing points, one of which is formed with the aforementioned window, this window has the following coordinates:

Coordinates of the window W3': (W3x', W3y'), wherein:

$$W3x'=(3*P2x'+P3x')/4,$$

and $$W3y'=(3*P2y'+P3y')/4;$$

Coordinates of the window W4': (W4x', W4y'), wherein:

$$W4x'=(P2x'+3*P3x')/4,$$

and $$W4y'=(P2y'+3*P3y')/4.$$

Likewise, the windows W1' and W2' have to be created on the segment 25. The creating procedure is similar to the aforementioned one. In this case, the coordinates of the windows are as follows:

Coordinates of the window W1': (W1x', W1y'), wherein:

$$W1x'=(3*P2x'+P4x')/4,$$

and $$W1y'=(3*P2y'+P4y')/4;$$

Coordinates of the window W2': (W2x', W2y'), wherein:

$$W2x'=(P2x'+3*P4x')/4,$$

and $$W2y'=(P2y'+3*P4y')/4.$$

Thus, the two windows are created on each of the two segments. If the Y-axis projected cumulative histogram is created in each window, the portion to intersect the segment has a high change in the histogram so that the position on the segment can be obtained. Since the segment has a thickness in this case, the upper edge portion and the lower edge portion of the segment are positioned. Only the information of the upper edge portion may be used for the windows W3' and W4', and only the information of the lower edge portion may be used for the windows W1' and W2'. The intersections between the windows W1', W2', W3' and W4' and the segment have Y-coordinates W1y', W2y', W3y' and W4y'.

The segment 24 is determined by the following equation as the straight line joining the points (W2x', W2y') and (W3x', W3y'):

$$y=(W3y'-W2y')(x-W2x')/(W3x'-W2x')+W2y'.$$

The segment 26 is determined by the following equation as the straight line joining the points (W1x', W1y') and (W2x', W2y'):

$$y=(W1y'-W2y')(x-W2x')/(W1x'-W2x')+W2y'.$$

The liquid surface height can be obtained as the intersection of the aforementioned two straight lines, as described hereinbefore.

In order to eliminate the ambiguous points of the liquid surface due to the intrinsic properties of the liquid such as the capillary phenomenon or the transparency, according to the present invention, the straight line oblique to the side wall is added so that the surface level of the liquid can be automatically measured by analyzing the camera image.

Figure 11:
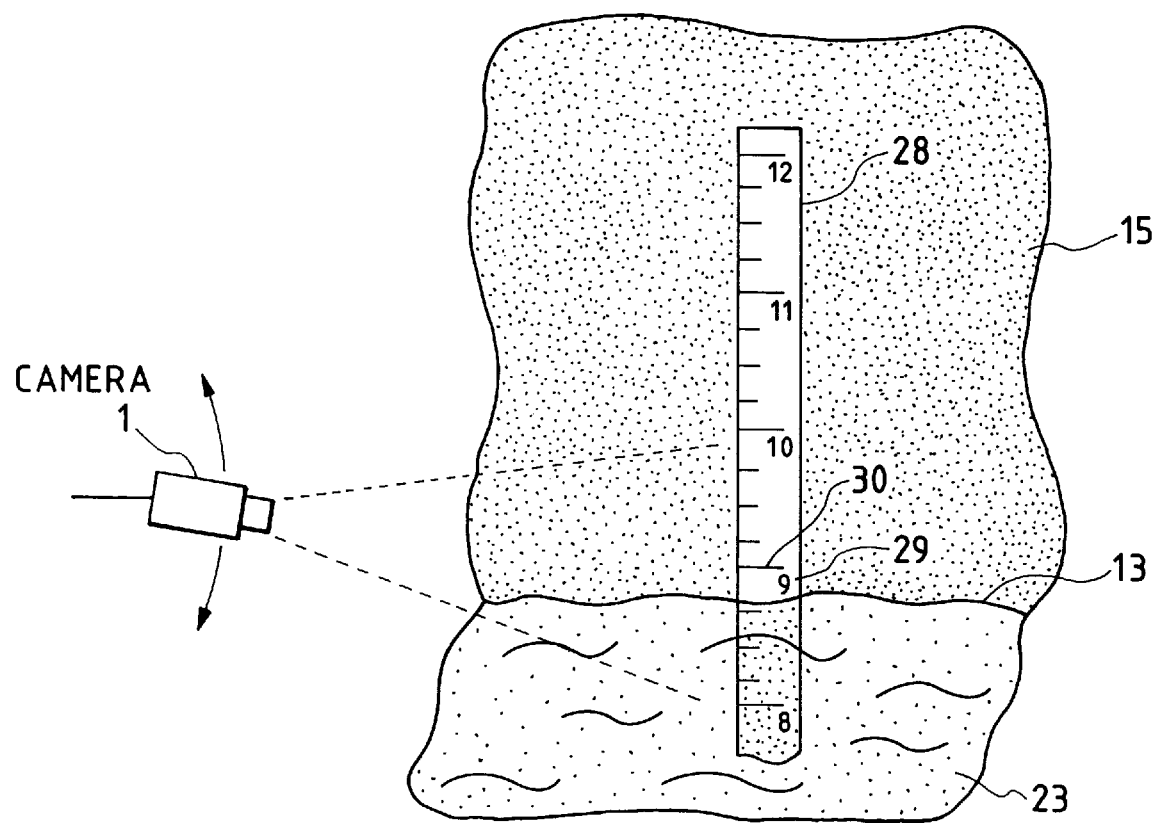
FIG. 11 is a flow diagram for measuring the height of the liquid surface by reading a graduation and a letter.

FIG. 11 shows one example for measuring the liquid surface in case the liquid has a low transparency. The wall surface is formed with a scale (including a memory and numerals), which is read as far as can be by the image processing so that the liquid surface is determined from the read point.

Figure 12:
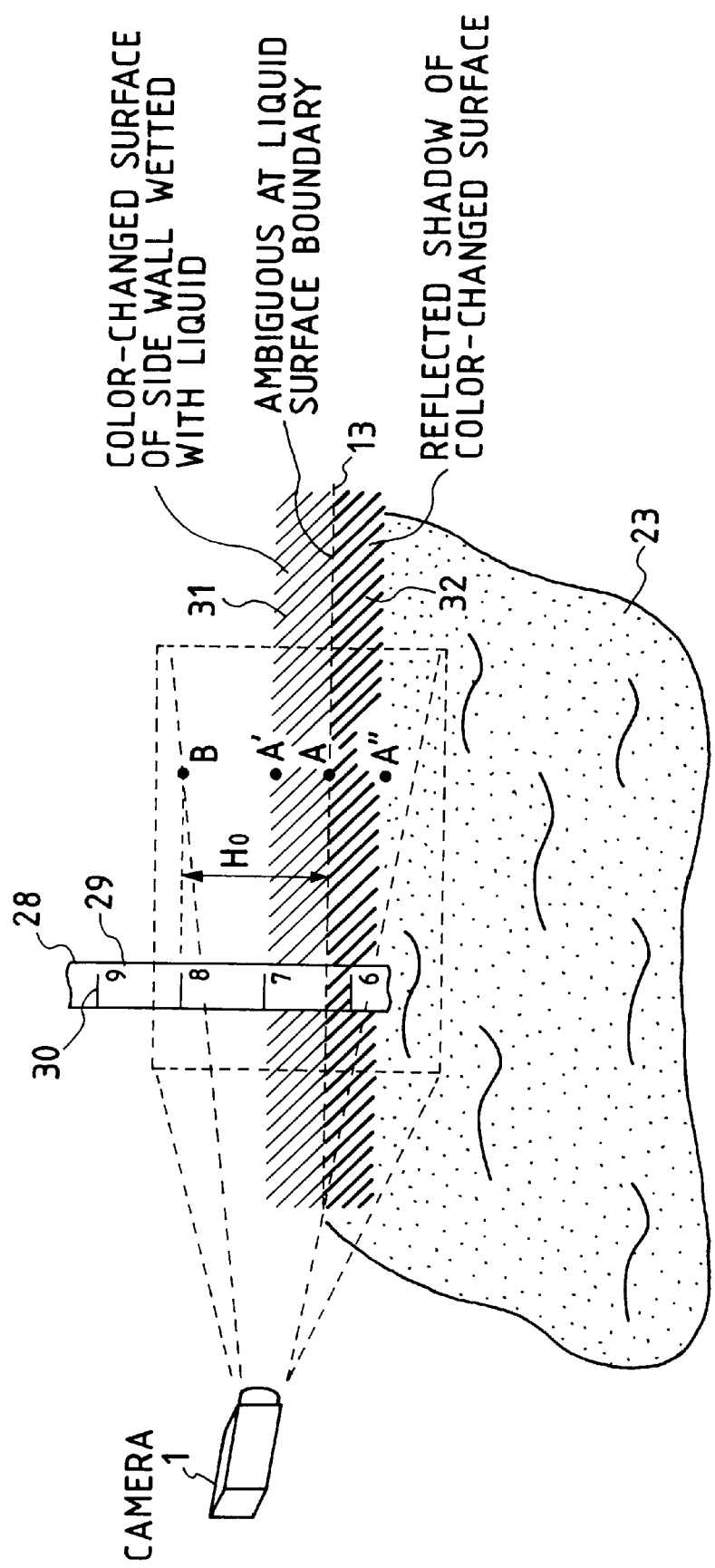
FIG. 12 is a flow diagram for measuring the liquid-surface height by utilizing the reflected shadow of the portion which is wetted to have its color changed by the capillary phenomenon of the boundary between the liquid surface and the side wall.
Figure 13:
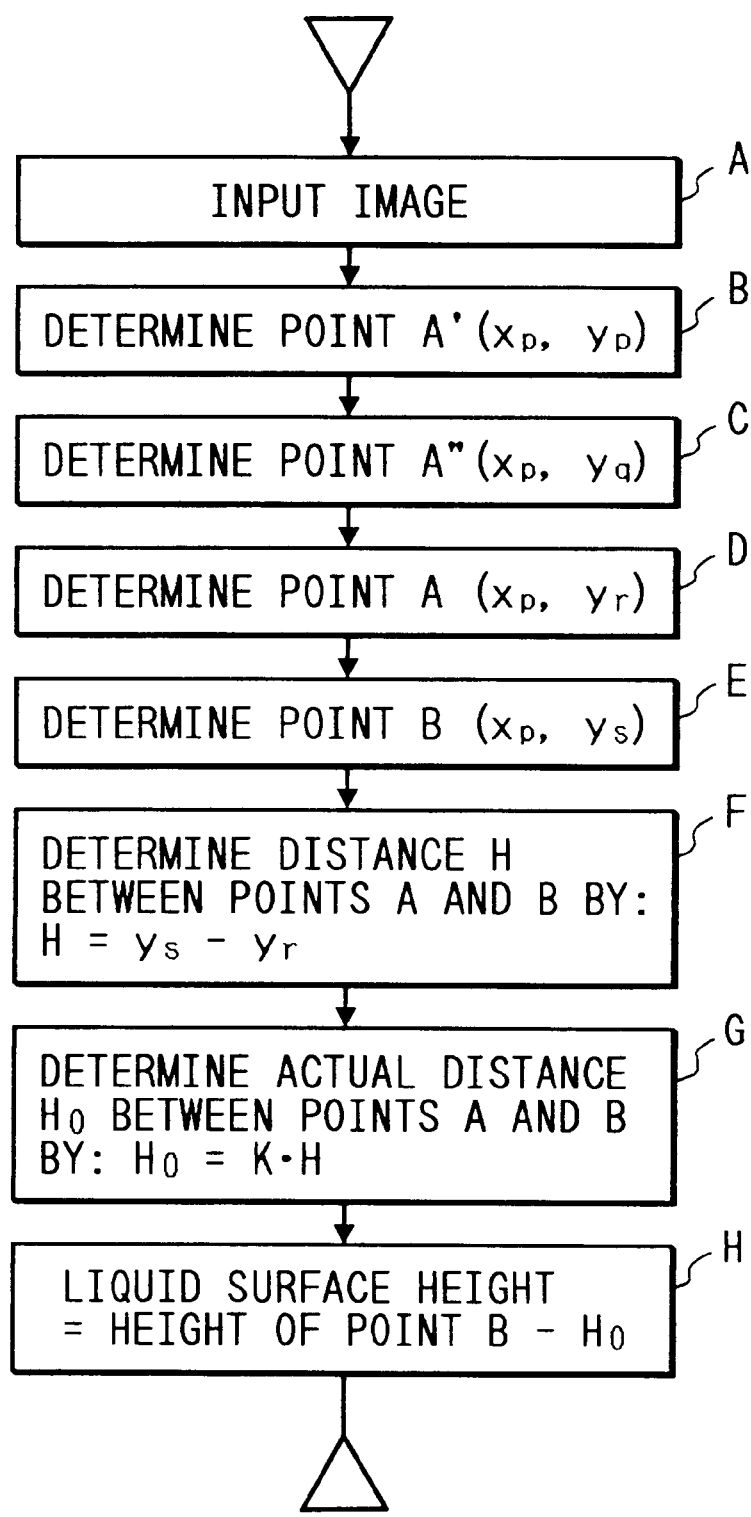
FIG. 13 is a flow chart for measuring the liquid- surface height by utilizing the color-changed surface wetted with the liquid.

FIG. 12 shows one embodiment of the present invention of the case, in which the side wall has its color changed by the capillary phenomenon so that the boundary portion of the liquid surface cannot be recognized as the image. In the instance wherein a point A is located at the boundary 13 between the liquid surface 23 and the side wall 15 so that the color is changed from the point A to a point A' by the capillary phenomenon, according to this liquid surface measurement, the portion AA' is reflected by the liquid surface to create a reflected image AA". With reference to FIG. 13, here will be described one example of the image processing of this case. First of all, the image is fetched to measure the positions of the points A' and A" in the image. The median between the points A' and A" is calculated to locate the position or the point A or the liquid surface.

FIG. 13 shows a flow of image analysis. A of FIG. 13 is a step into which an image is input. B and C of FIG. 13 are steps in which A' and A" (shown in FIG. 12) are determined. D of FIG. 13 is a step in which A (shown in FIG. 12) is determined. A (shown in FIG. 12) is equidistant between A' (shown in FIG. 12) and A" (shown in FIG. 12). E of FIG. 13 is a step in which B (shown in FIG. 12) is determined. B (shown in FIG. 12) is a standard point on the measuring plate. F of FIG. 13 is a step in which H (shown in FIG. 12) is determined. Said H is derived by subtracting the height of A from the height of B. Said H expresses the space of point A and point B in an image. G of FIG. 13 is a step in which said H is replaced with $H_0$. Said $H_0$ expresses the actual space of point A and point B. "K" is a coefficient for replacement. H of FIG. 13 is a step in which an actual water surface is determnined. The actual water surface is required by subtracting said $H_0$ from said point B.

Figure 14:
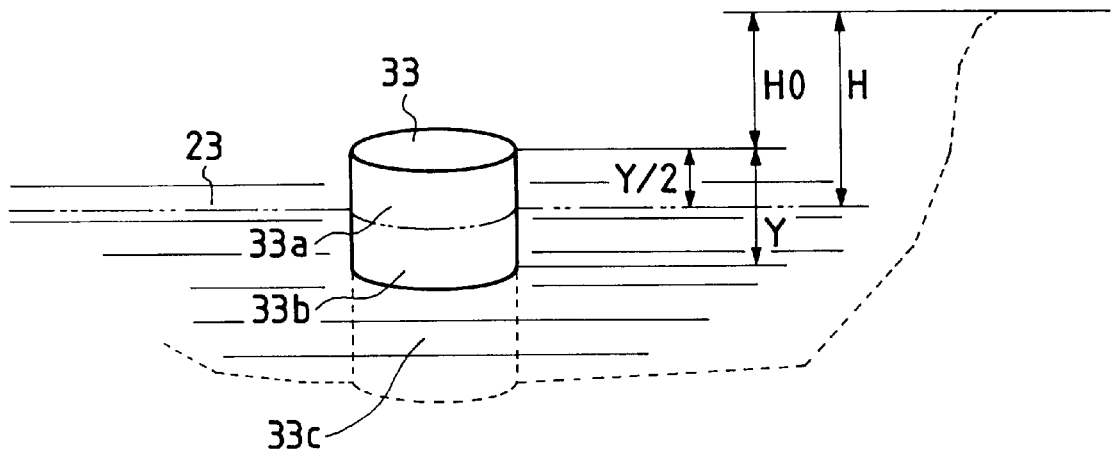
FIG. 14 is an explanatory diagram showing another embodiment in the case wherein the liquid has a mirror surface and a projection therein.
Figure 15:
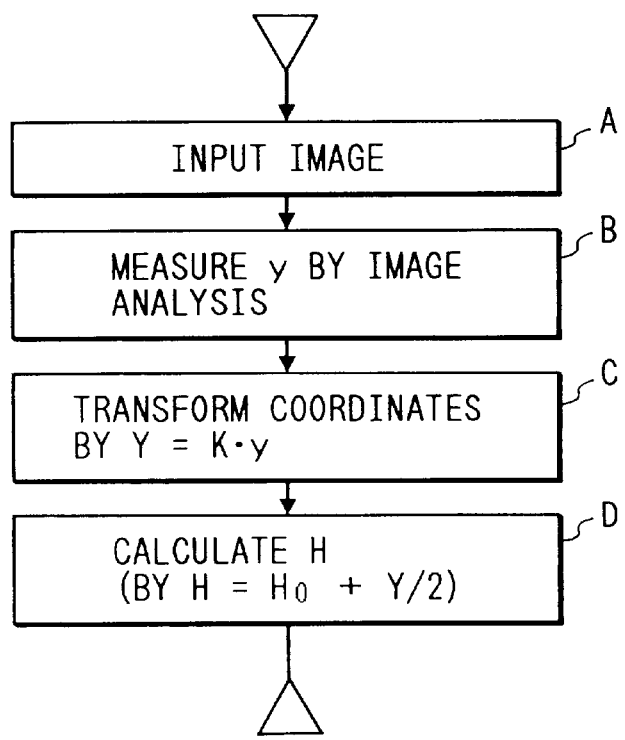
FIG. 15 is a flow chart of an image processing procedure in the case wherein the liquid has a mirror surface and a projection therein.

FIG. 14 shows one embodiment of the case in which a projection 33 is present in the liquid. The liquid is conditioned to have a low transparency but a high surface reflectivity. An upper portion 33a of the projection over the liquid is reflected on the liquid surface to produce an image 33b in the image, but a portion 33c of the projection submerged in the liquid is not seen because of the low transparency. An example of the image processing of this case is shown in FIG. 15. First of all, the image is fetched, and the height y of the portions 33a and 33b is measured in the image. This height y is transformed into the real size by:

$$Y=K*y.$$

If the position H0 of the top of the projection is known, the position of the liquid surface is obtained from the following equation:

$$H=H0-Y/2.$$

According to the embodiments of the present invention described above, the height of the liquid surface can be obtained by the image processing, even in case the boundary between the wall surface and the liquid surface is ambiguous due to the capillary phenomenon or the transparency of the liquid, so that the liquid surface can be automatically measured by the image processing which can be easily handled. As a result, the automatic measurement can be achieved merely by setting the monitor camera at the site while requiring no periodic inspection of the operator.

Although the embodiments thus far described measure the water level by detecting the boundary between the water surface and the side wall, the water level measurement can also be accomplished by using the image of a measuring plate projecting from the water surface. Here will be described an example using the image of the measuring plate.

Figure 16:
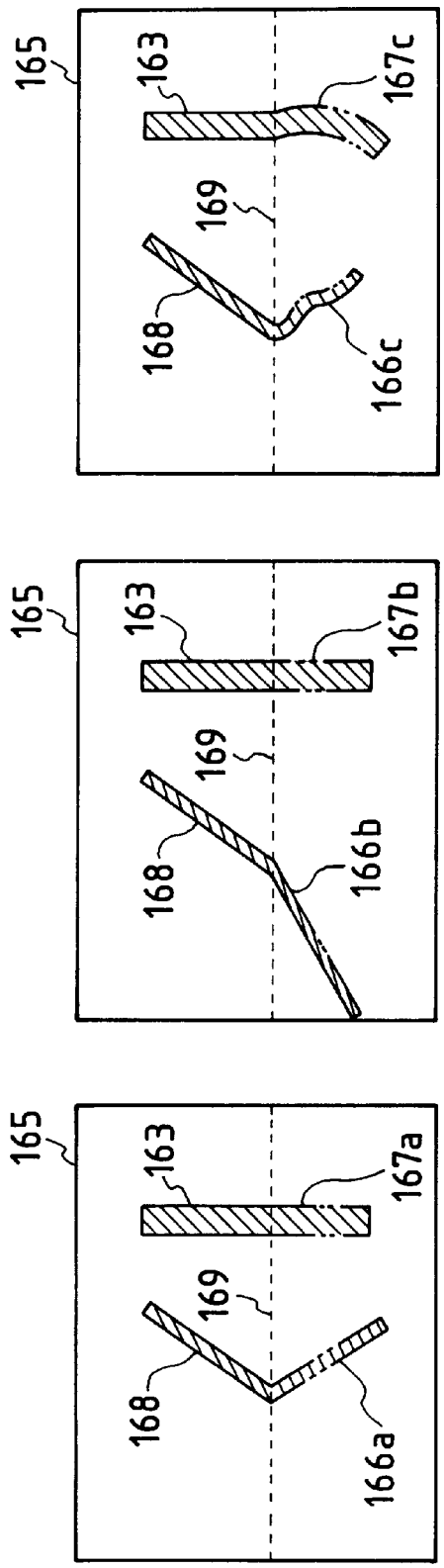
FIGS. 16A, 16B and 16C are explanatory diagrams showing a detecting principle of an oblique plate method using a sub-measuring plate.

FIG. 16A shows an example of an image 165 for measuring the level of opaque water standing still. A measuring plate 163 is disposed normal to the water surface, and a sub-measuring plate 168 is obliquely disposed at the side of the measuring plate 163. Since this measuring plate 163 creates its reflected image 167a on the water surface, the boundary between the real image and the mapped image cannot be recognized making it difficult to measure the water level 169 directly. Since, on the other hand, the sub-measuring plate 168 is inclined with respect to the water surface, its reflected image 166a on the water surface appears in a symmetric position with respect to the water surface boundary 169. Therefore, the intersection between the two images of the real image of the sub-measuring plate 168 and the reflected image 166a is determined as the water surface position 169 and is transformed by the graduation coordinates of the measuring plate 163 on the image to measure the water level 169.

FIG. 16B shows an example of an image for measuring the level of transparent water standing still. In this transparent water, a refracted image 267b from the water surface appears more clearly than the reflected image on the surface so that the boundary between the measuring plate 3 and the water surface cannot be recognized. Since, however, a refracted image 166b of the sub-measuring plate 168 is also clear, the water level 169 can be measured as in the case of FIG. 16A.

Thus, the water level can be measured by the image processing even by using the inclined sub-measuring plate. This method will be called the "oblique plate method".

According to this oblique plate method, the water level can be highly accurately measured in case the water surface is still. In the surface of flowing water having waves or vortexes of considerable scale on the water surface, however, the mapped image 166c is distorted, as shown in FIG. 16C, so that it cannot be clearly recognized. As a result, the intersection between the real image and the mapped image cannot be accurately determined making the water level measurement difficult.

Here will be described another embodiment of the present invention, in which the surface level of the flowing water is measured by using the image.

In the embodiment to be described first of all, the position of the flowing water surface is measured by using the image of a measuring plate disposed normal to the water surface.

Figure 17:
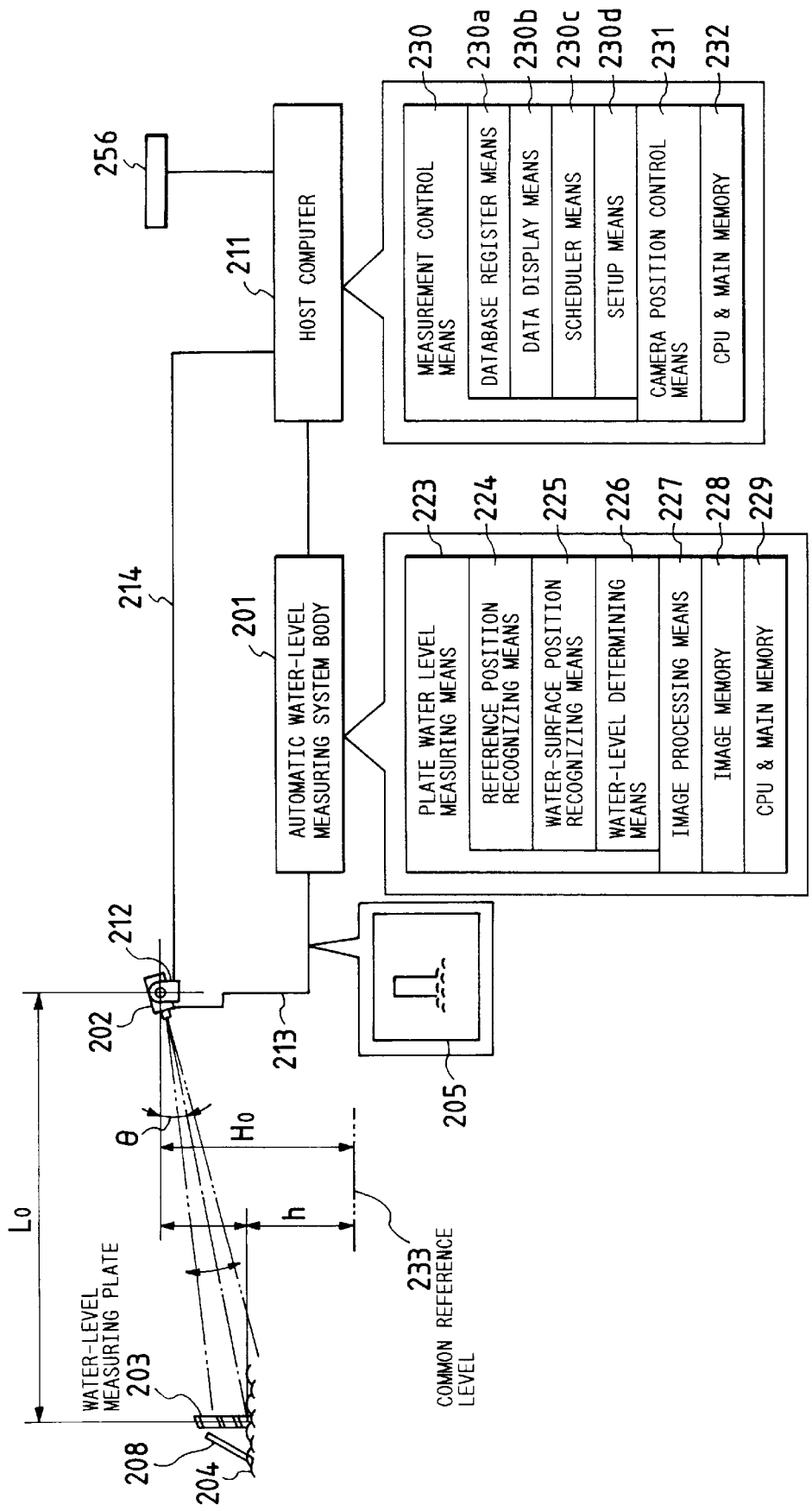
FIG. 17 is a diagram showing the entire construction of an automatic water-level measuring system according to one embodiment of the present invention.

FIG. 17 schematically shows the entire construction of a water level measuring system and the water level measuring principle according to another embodiment of the present invention. In a water surface 204 the level of which is to be measured, there are disposed a water level measuring plate 203 and a sub-measuring plate 208. The measuring plate 203 is given a structure similar to that of the measuring plate of the prior art for visual inspection and is disposed normal to the water surface so that the vertical difference from the national standardized reference level of the water level can be read in terms of numerals and graduations. The sub-measuring plate 208 is a rectangular plate, as seen obliquely from the front, and is disposed in the water just at the side of the measuring plate 203. This sub-measuring plate 208 is provided for recognizing the water surface position of the still water by the image processing, as described above.

In the present embodiment, the image of the measuring plate 203 or of both the measuring plate 203 and the sub-measuring plate 208 is fetched by an ITV camera 202 and is subjected to an image analysis, as will be described hereinafter, by an automatic water-level measuring system body 201 to decide the water level.

This water-level measuring system body 201 is constructed of: plate water-level measuring means 223 composed of reference position recognizing means 224, water-surface position recognizing means 225 and water-level determining means 226; image processing means 227; an image memory 228; and a CPU and main memory 229. The plate water-level measuring means 223 of the present embodiment is the function which is realized by the CPU & main memory 229.

The measurement result of the water-level measuring system, body 201 is transmitted to a host computer 211 and is latched in the database so that it is displayed in a display 256 or transmitted to another related system. The host computer 211 is composed of a measurement control means 230, camera position control means 231 and a CPU & main memory 232. The means 230 and 231 in the present embodiment are also the functions which are realized by the CPU & main memory 232. Incidentally, the water-level measuring system body 201 and the host computer 211 may be realized by one computer.

Figure 18:
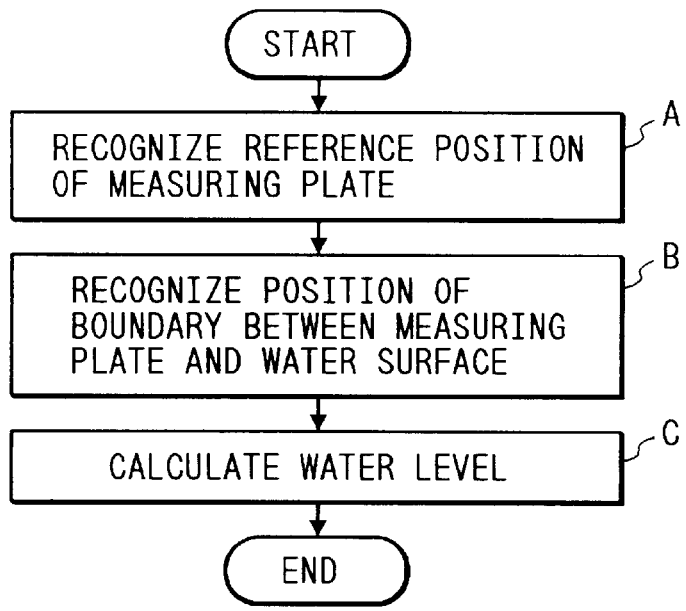
FIG. 18 is a schematic flow chart of the water- level measuring procedure.
Figure 19:
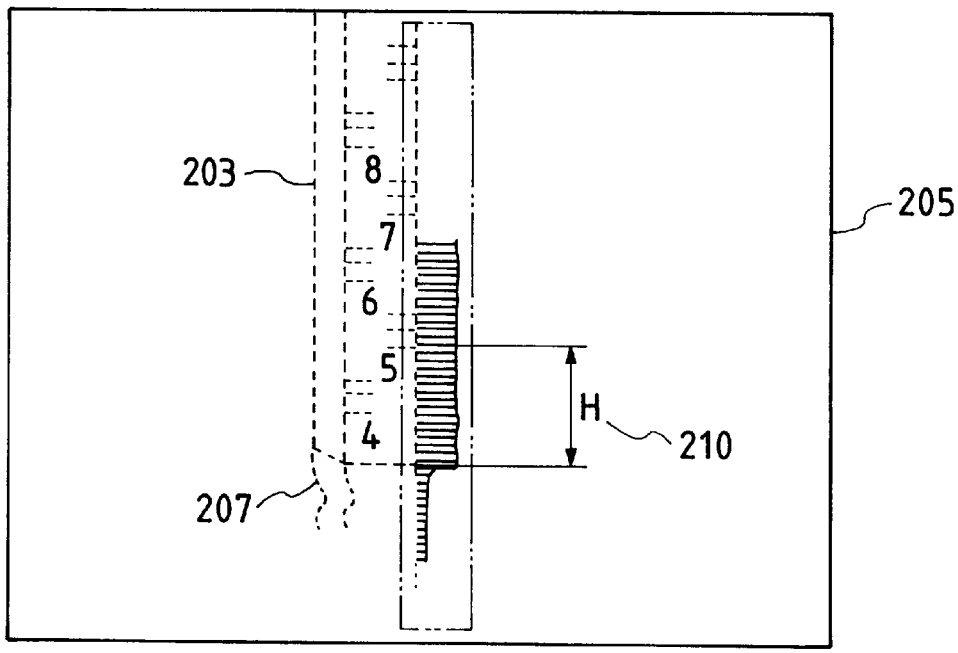
FIG. 19 is an image diagram showing a picture of the boundary between the measuring plate and the water surface by a camera.

Here will be described the operations of the water-level measuring system of the present embodiment. FIG. 18 is a general flow chart schematically showing the procedure. In a processing Box A, the graduation numeral on the measuring plate 203, as shown in FIG. 19, is fetched by the image processing to decide the reference position (i.e., a graduation corresponding to numeral 5 in the shown example) according to the fluctuation of the water level, as will be described hereinafter. An altitude h from the common reference level 233 is set with respect to that reference position. The common reference level 233 is usually exemplified by the national standardized reference but may be exemplified by another specific place. Incidentally, this reference position is not changed when the numeral indicating the graduation of the previous reference position can be recognized.

In a processing Box B, the boundary position between the front face of the measuring plate 203 and the water surface is recognized by the later-described image processing. Since the position of the surface of the still water cannot be recognized only by the image analysis of the measuring plate 203, under this condition, the real image and the mapped image of the sub-measuring plate 208 are analyzed to determine the boundary position. Since the measuring plate 203 and the sub-measuring plate 208 are juxtaposed to each other, it is advantageous for the processing that they are taken in the same camera picture, but they may be taken into different camera pictures. At these different pictures, an adjustment is made to make the physical vertical positions identical between the two pictures.

In a processing Box C, the water surface position is calculated from the reference position and the boundary position. From the image graduations of the reference position and the boundary position on the measuring plate of FIG. 19, an real distance H corresponding to the graduation difference is calculated to determine the water level=the reference position altitude $H_0-H$.

Next, here will be described a water level measurement by the image processing for the surface of flowing water (which is contrary to the still water surface) having waves or vortexes on the water surface. For the flowing water surface, it is difficult to apply the aforementioned oblique plate method. It is quite natural that the direct image of the vertical measuring plate does not allow the water surface boundary to be recognized due to the obstruction by its mapped image or the fluctuation of the water level. In the present embodiment, therefore, there is realized a unique method in which the water surface boundary is recognized by utilizing the characteristics of the water surface to process a plurality of images taken for a constant time period.

In the present embodiment, there is realized a method in which the water surface boundary is recognized by utilizing the optical characteristics of the waving water surface to take the density image of the vertically disposed measuring plate periodically and by processing the plurality of images. This method will be called the "vertical plate method".

FIGS. 20 and 21 are schematic diagrams for explaining the water level measurement by the differentiations according to one embodiment of the vertical plate method.

Figure 20A:
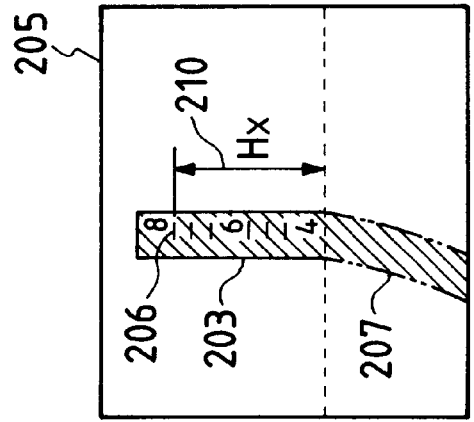
FIGS. 20A, 20B and 20C are explanatory diagrams showing one embodiment (of a differentiating pattern) of a vertical plate method of the present invention.

FIG. 20A is a density image at a time of the case in which the water surface has fluctuations in the in put image 205 of the measuring plate 203 of a measuring area. The real image 203 and the mapped image (i.e., reflected or refracted image) 207 are joined so that the boundary is substantially difficult to recognize.

Figure 20B:
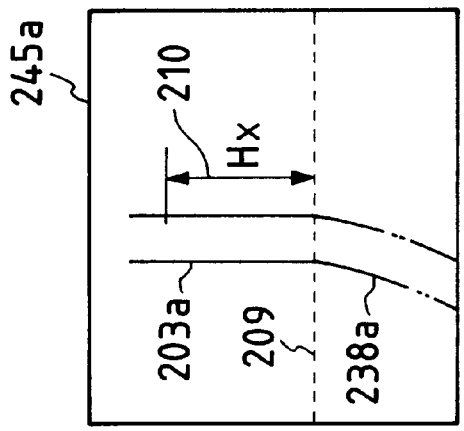
Figure 20C:
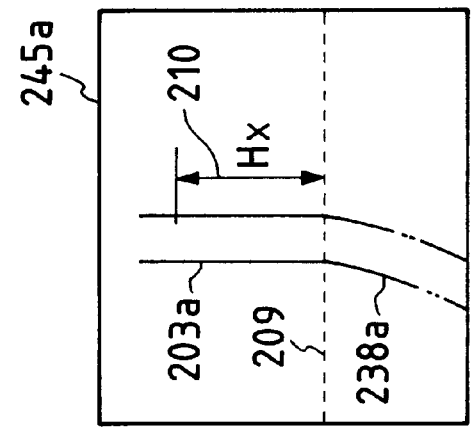

FIG. 20B shows a differential image (or data) when the density of the input image of FIG. 20A is once differentiated in the X-direction. Since the density change of the input image reaches its maximum at the contour of the measuring plate 203, the control 203a of the real image 203 and the contour 238a of the mapped image 207 are easier to recognize than the image of FIG. 20A so that the water surface boundary can be determined from their intersection if an angle is present therebetween. In the image having a balanced fluctuation of the water surface, however, the differentiated real image 203a and the mapped image 238b are straight or have a small angle, as shown in FIG. 20c. In this case, the boundary is difficult to recognize so that the method cannot be applied to the practical use.

As shown in FIG. 21, therefore, only the contour 203a of the real image is discriminated by cumulating a plurality of images 233 to 236 which are inputted and differentiated for a predetermined period or time. These images 233 to 236 are those which are formed by differentiating the density images inputted at times t1 to tn into binary images. The density threshold value for the binary processing is so suitably set that the background (or water surface) and the contour of the image (of the measuring plate) may be discriminated.

An image 239 is a cumulation of the binary images of the images 233 to 236 on the density image. In this image, the density value of the background (i.e., the water surface) is zero if the noise is ignored. A portion 240, in which the contour 203a of the real image is cumulated, exhibits the maximum density, and the density value ought to have the maximum n if an n-number of images are cumulated. As a matter of fact, the picture has an error so that the density takes a value slightly smaller than n. Most of the contour 238a of the mapped image has a low density because no image is overlapped. The density value takes a high value at a point, in which the contours are intersected to overlap. However, the overlap takes place by about n/2 at the maximum and creates a point or a short line.

Therefore, the cumulative density image 239 is binary-processed with a predetermined threshold valve TH. Then, the contour 238 of the mapped image is erased, and the contour 244 of the real image 203 is discriminated. The contour 244 is that of the side of the measuring plate 203 over the water surface so that its lower end gives a water surface boundary 209. Incidentally, the threshold valve TH is about 0.5n to 0.9n (n: a positive integer) and is set as high as possible when the image is stably created without any noise. Even if, however, the threshold value TH is in the neighborhood of 0.5n, the highly dense portion of the contour 238a of the mapped image to be left is limited to the partial region remarkably close to the contour 244 so that its influence upon the measuring accuracy of the water level is so low as to be neglected.

Figure 22:
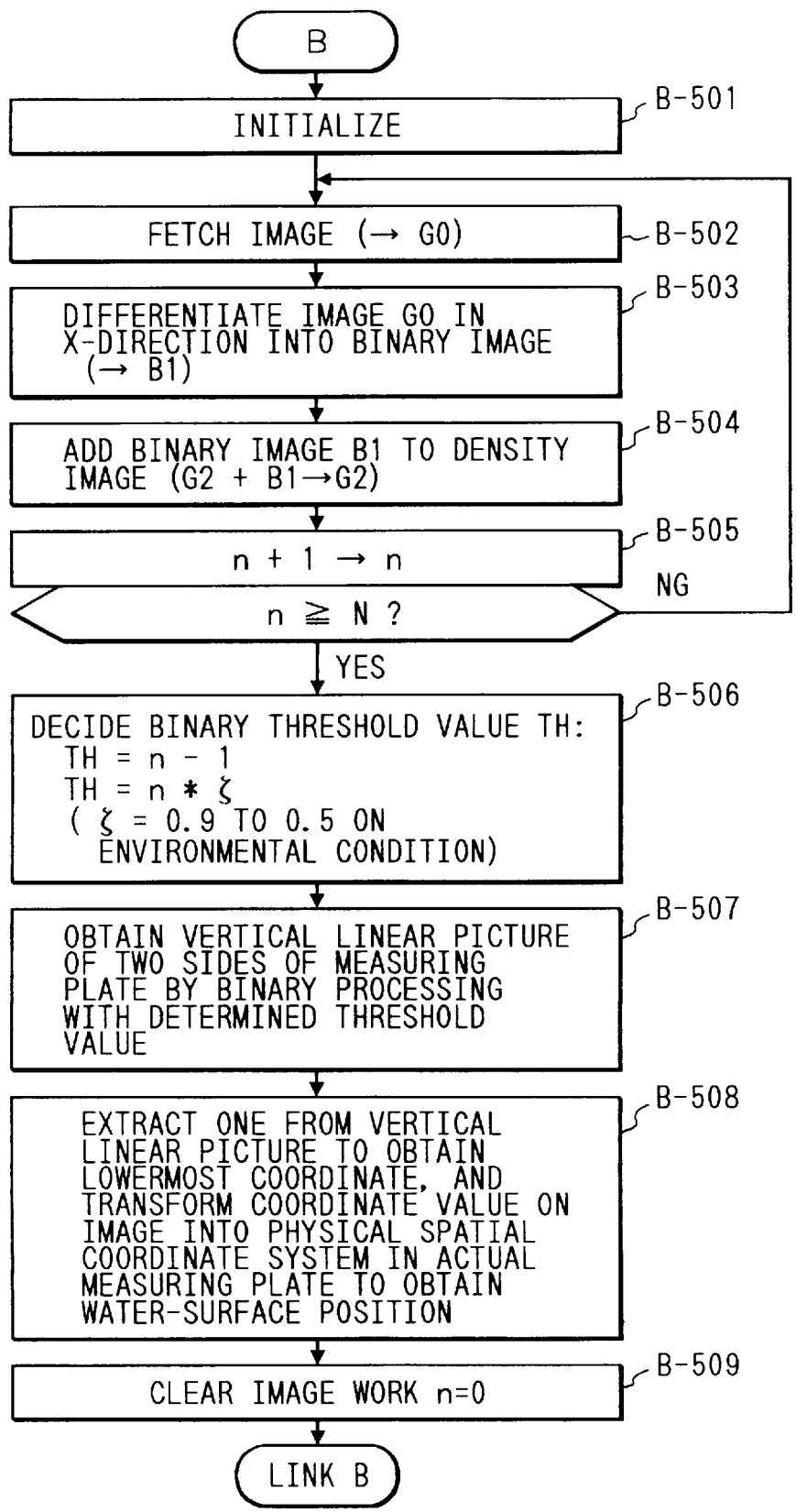
FIG. 22 is a flow chart showing the water-level measuring procedure by a differentiating pattern.

FIG. 22 is a flow chart of the aforementioned water level measuring method (i.e., the vertical plate method of the differentiation type).

First of all, the routine is initialized to clear the counter (e.g., to clear the value n to zero or the density image image G2 to zero) (at B-501). Next, the image is fetched and latched in a density image memory G0 (at B-502). The content of the density image memory G0 is differentiated in the X-direction into a binary value, and this binary value is stored in a binary image memory B1 (at B-503). Next, the content of the binary image memory B1 is added to the density image memory G2 (corresponding to an image 239) (at B-504). Incidentally, the differentiated image may be added as it is without being made binary. Incidentally, the binary threshold value is so high as to separate the boundary between the measuring plate and the water surface and the background (or the water surface).

Next, the counter n is updated, and this updating is repeatedly executed until a predetermined value N is exceeded (at B-505). When the predetermined value N is exceeded, the density image G2 is made binary, and the binary value is latched in a binary image memory B2 (corresponding to an image 243) (at B-506 and B-507). The binary threshold value TH at this time is set according to the using environment, as described above.

In the image memory 243, there appear the straight line 244 of the vertically positioned measuring plate 203 above the water surface. One straight line is; extracted from that vertical linear figure to determine its lowermost end coordinates. Alternatively, the two lowermost end coordinates are averaged (at B-508). This lower end coordinates into a physical spatial coordinate system in the actual measuring plate to determine the water surface position. Finally, a post-processing is executed to clear the image work (at B-509).

The present embodiment can be applied to both day and night uses if a density difference exists between the measuring plate and the background water surface. Incidentally, it is quite natural that an illumination of a faint light is necessary for night use.

Figure 23:
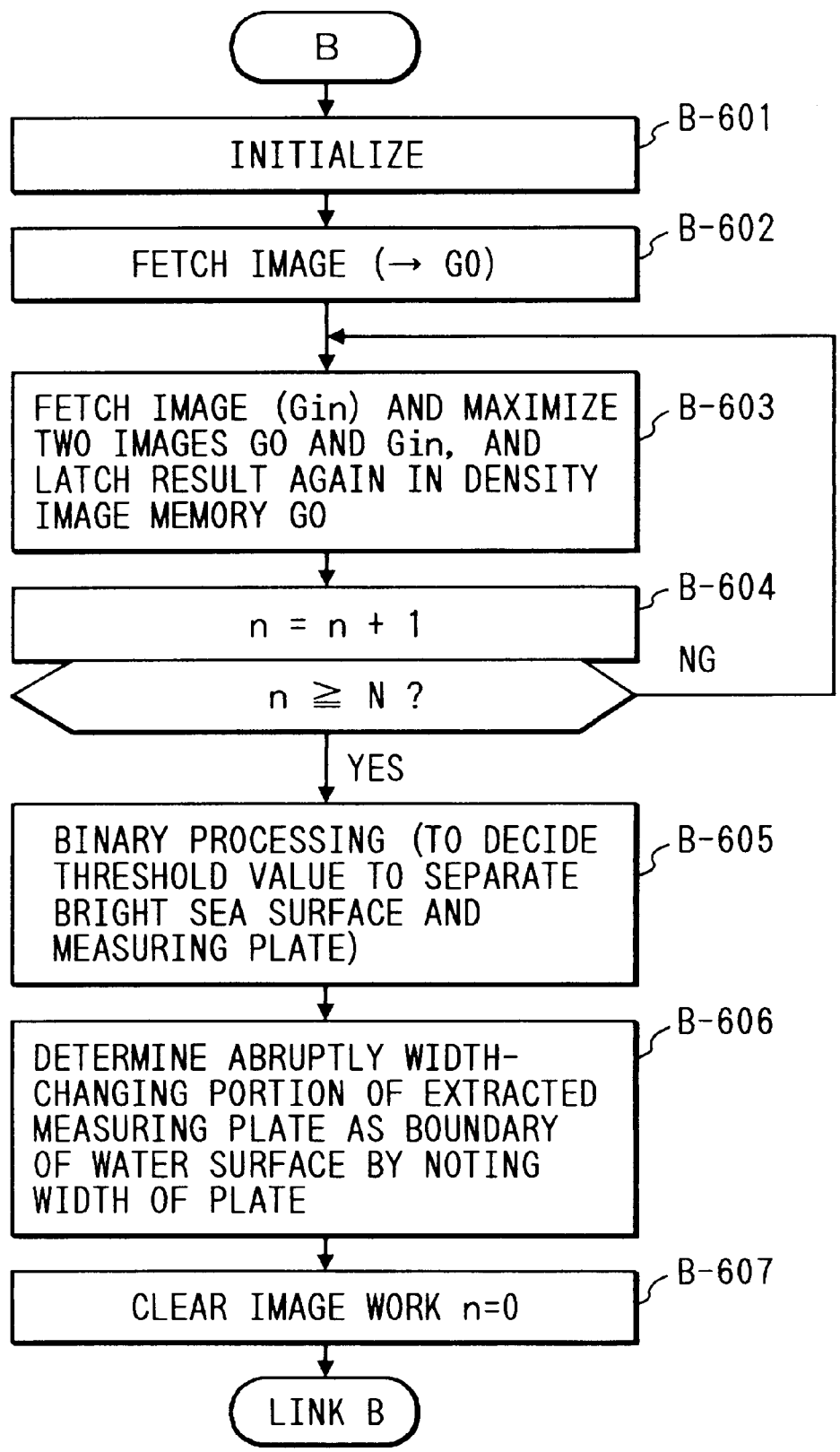
FIG. 23 is a flow chart showing the water-level measuring procedure according to another embodiment (using a maximizing pattern) of the vertical plate method of the present invention.

Next, another water-level measuring method (as will be called the vertical plate method of maximizing type) according to the vertical plate type will be described with reference to the flow chart of FIG. 23. The present method is suitable for the case in which the water surface is brighter than the measuring plate.

In the first initializing step (B-601), the counter and the image memory are initialized. Next, the image is fetched and latched in the image memory G0 (at B-602). Next, the image is fetched again, and the input image and the image memory G0 are maximized so that the result is latched again in the memory G0 (at B-603). As a result, when the same image position fluctuates in relation to the water surface or the mapped image, the density of the brighter water surface is adopted and latched in the memory GO. When these steps are repeated at a constant number of times (at B-604), the mapped image density of the water surface is transformed into the density of the water surface. When the density image thus obtained by the aforementioned steps is subjected to a binary processing (at B-605), the picture of the measuring plate of low density is voided.

Figure 24:
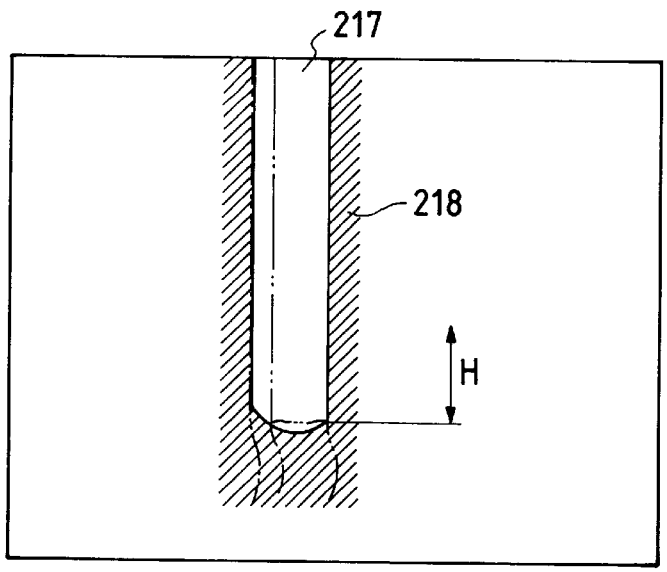
FIG. 24 is an image diagram of the processed result by the maximization pattern.

FIG. 24 shows one example of the binary image thus obtained, which is completely divided into a portion 217 of the measuring plate of lower density and a portion 218 of the water surface of higher density. This is the void image of the measuring plate over the water surface. Noting the width of the portion 217 of the measuring plate, the vertical coordinate, at which the width abruptly changes, is detected to determine the boundary position from the water surface (at B-606). The distance H indicates the difference between the boundary position and the reference position.

According to the present embodiment, the water level can be highly accurately measured in the daytime at which the water surface reflects the solar ray so that it becomes brighter than the measuring plate.

Figure 25:
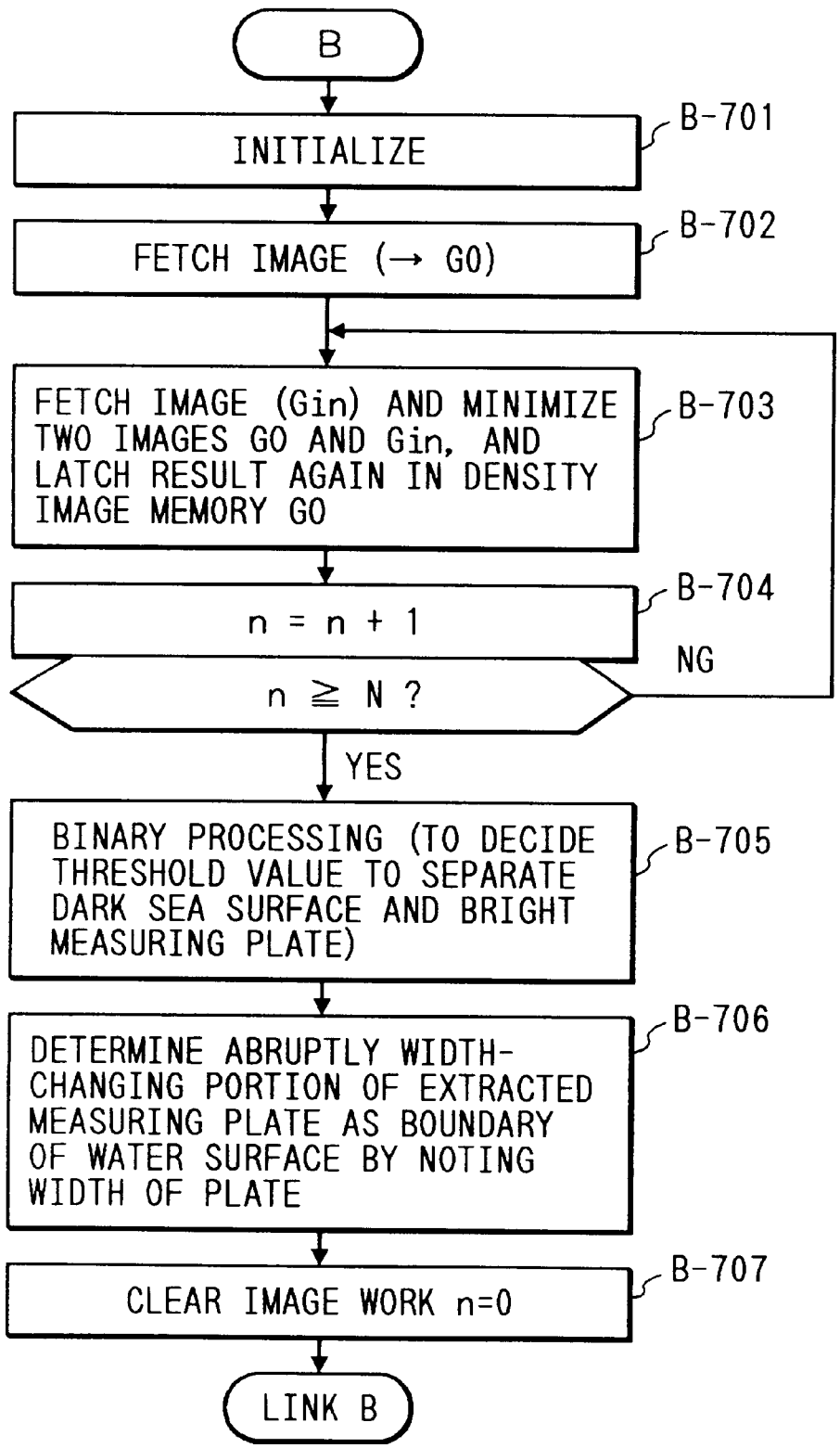
FIG. 25 is a flow chart showing a water-level measuring procedure according to another embodiment (using a minimizing pattern) of the vertical plate method of the present invention.

Next, still another water-level measuring method (as will be called the "vertical plate method of minimizing type") according to the vertical plate type will be described with reference to a flow chart of FIG. 25. The present method is suited for the case in which the water surface is darker than the measuring plate.

First of all, the counter and the image memories are initialized (at B-701). Next, the image is fetched and latched in the image memory G0 (at B-702). Next, the image is fetched again, and the input image and the image memory G0 are minimized so that the result is latched again in the memory G0 (at B-703). As a result, when the same image position is fluctuates in relation to the water surface or the mapped image, the density of the dark water surface is adopted and latched in the memory G0. When these steps are repeated at a constant number of times (at B-704), the bright mapped image density of the water surface is transformed into the dark density of the water surface. When the density image thus obtained by the aforementioned steps is subjected to a binary processing (at B-705), the picture of the measuring plate of low density is voided.

Figure 26:
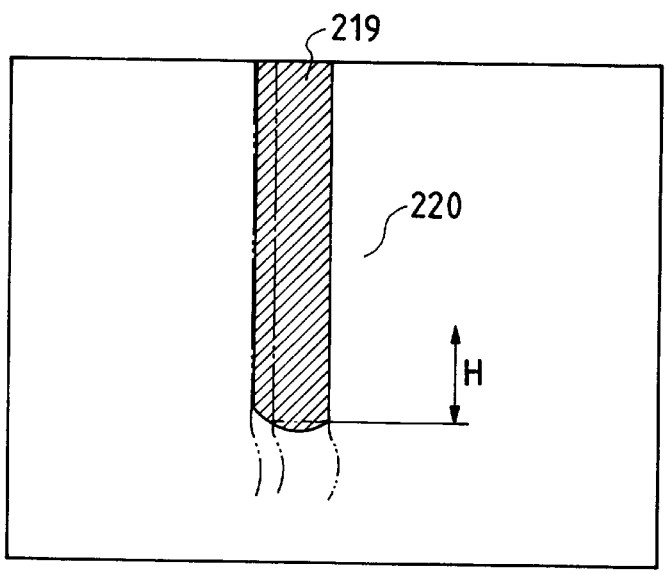
FIG. 26 is an image diagram of the processed result by the minimization pattern.

FIG. 26 shows one example of the binary image thus obtained, which is divided into the measuring plate 219 of higher density and the water surface 220 of lower density. The vertical coordinate, at which the width of the measuring plate 219 abruptly changes, is detected to determine the boundary position from the water surface (at B-706).

According to the present embodiment, the water level can be measured with high accuracy at night when the water surface becomes darker than the measuring plate.

Figure 27:
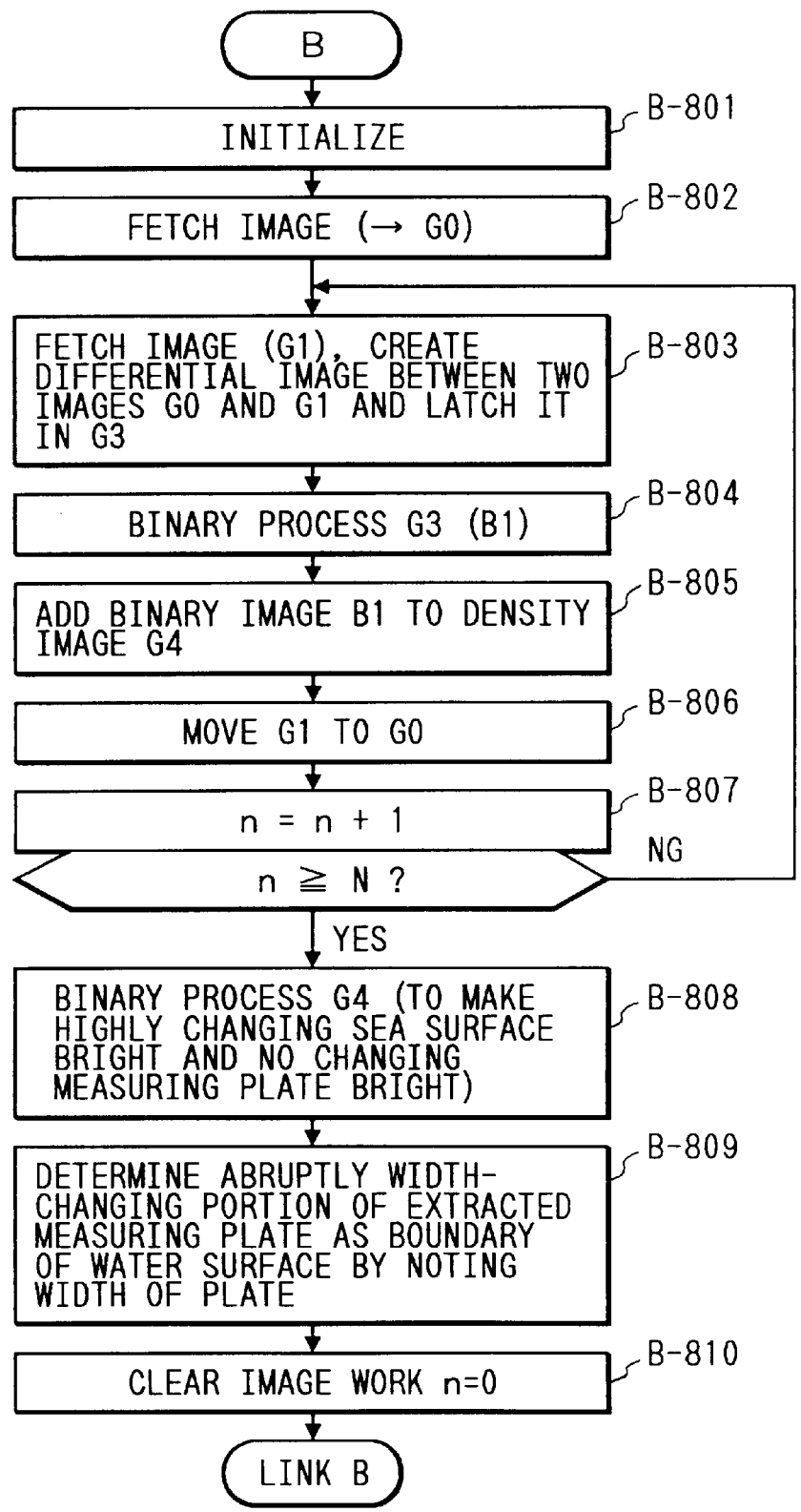
FIG. 27 is a flow chart showing a water-level measuring procedure according to another embodiment (using a difference pattern) of the vertical plate method of the present invention.

Next, still another water-level measuring method (as will be called the "vertical plate method of difference type") according to the vertical plate type will be described with reference to a flow chart of FIG. 27. The present method is an example in which the image processing is executed while noting that the change in the brightness of the water surface with the time is larger than that of the measuring plate.

First of all, the counter and the image memories are initialized (at B-801). Next, the image is fetched and latched in the image memory G0 (at B-802). Next, the image is fetched again and latched in an image memory G1, and the images are processed between the memories G0 and G1 so that the time difference image is created and stored in an image memory G3 (at B-803).

By this time difference, there is stressed the water surface having a larger density change and the measuring plate having a smaller density change over time. The image memory G3 or its binary value is cumulated in a density image G4 (at B-804 and B-805). The data of the image memory G1 are transferred to the image memory G0 (at B-806). These steps are repeated by a constant number (at B-807). The image thus obtained is made binary (at B-808). Incidentally, the change in the brightness of the water surface for a short time period can be effectively detected if the time difference between the input images to be fetched by G0 and G1 is made sufficiently shorter than the repetition period of Step B-807.

Figure 28:
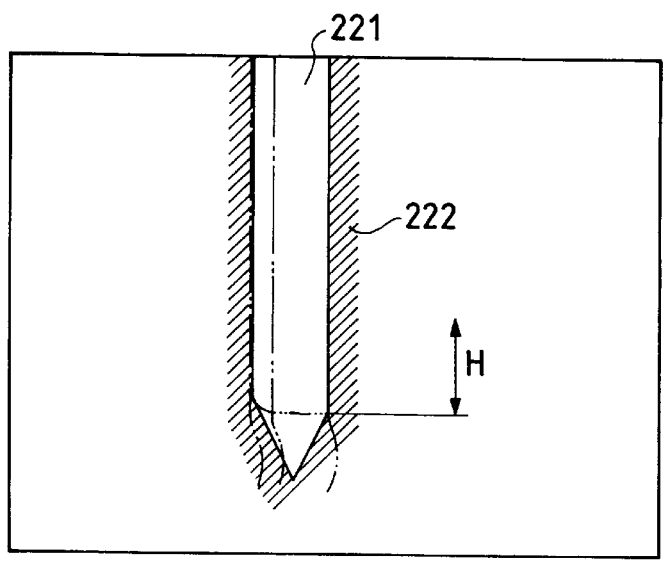
FIG. 28 is an image diagram of the processed result by the difference pattern.

FIG. 28 shows the binary image thus obtained, which is separated into a portion 221 of the measuring plate of lower density and a water surface portion 22 of higher density. The water surface boundary is determined by detecting the vertical coordinate, at which the width of the measuring plate 221 extracted abruptly changes (at B-809).

In a flowing water surface having waves or vortexes, according to the present embodiment, the density of each position of the water surface changes within a short time period. However, the measuring plate per se is hardly changed. As a result, the water level can be measured by the image processing independently of the brightness of the water surface under the circumstance in which the water surface is moving.

As to the four water level measuring methods of the vertical plate type thus far described, the accuracy of the water level measurement by the image processing can be improved by selecting one of the differentiating or difference type capable of measuring not only at daytime but also at night or by combining a plurality of types to use the most appropriate one according to the environmental conditions. Depending upon the place of application, moreover, the water level measuring method capable of matching any environmental condition can be realized by combining the vertical plate method and the oblique plate method. Here will be described one example of the selecting procedure of the measuring method, which is executed by the measurement control means 230.

FIG. 29 is an explanatory diagram showing the initial setting of a scheduler. Before the start of the measurement, the observer designates the measuring times and the measuring methods in a scheduler 230c. The item 251 for designating the measuring times sets the measuring hour and the measuring minute for one hour. Of course, the item 251 may designate the measuring periods by hour or minute. An item 252 for designating the measuring methods sets a group of the measuring time periods and the measuring methods. The four time periods of FIG. 29 are enumerated by daytime, evening, early morning and nighttime in the downward order, and Method 1 designates the maximizing type, Method 2 the differentiating or difference type, and Method 3 the minimizing type.

The initialized scheduler 230c instructs the automatic water-level measuring system body 201, when the designated measuring time comes, to start the measurement by the measuring method for the time period. As a result, the automatic water-level measuring System body 201 executes a highly accurate water-level measurement by adopting the measuring method which is most suited for the optical characteristics of the water surface for the time period.

Incidentally, the aforementioned selection of the measuring method depends upon the designation of the time period. However, the brightnesses (or illuminances) of the measuring plate and the water surface may be measured, and their absolute values and the brightnesses of the water surface and the measuring plate may be compared to adopt the method 1, if the absolute value is large and the water surface is brighter, the method 3, if the absolute value is small and the water surface is darker, and the method 2 if their difference is small.

Incidentally, the water-level measurement is influenced by the climate. A circumstance to be measured such as a dam or a trough gate frequently has a still and transparent water surface or an opaque water surface. However, the water becomes flowing water having waves when a strong wind blows or when it heavily rains. An ordinary river has still water in the neighborhood of two sides but has flowing water having waves or vortexes in the neighborhood of a rapid stream lit the mouth of a river for measuring the tide level, moreover, the water is frequently caused to flow by the sea waves but kept substantially still under the condition of a calm.

In order to cope with both the still water and the flowing water under such measuring circumstances, the aforementioned oblique plate method and vertical plate method are combined to select an optimum method according to the climate conditions such as wind or rain. Specifically, in accordance with the measuring circumstance, the vertical plate method is adopted if the wind velocity or rainfall or their combination exceeds a predetermined value, and otherwise the oblique plate method is adopted. As a result, the water-level measurement by the image processing can be adapted to the various measuring circumstances and the natural conditions.

Here will be described the camera position control and the setup processing, which are shared with the water-level measuring method using the image processing of the measuring plate. The measuring plate has a height of about 2 m, and a plurality of measuring plates are placed at different altitudes in a measuring point of a river because the river has its water level raised to 10 m or more by a flood. The water level has to be measured with an accuracy of about 1 cm so that the visual angle of the camera has to be suppressed within a certain degree. This makes it necessary to change the camera angle or the reference position of the water level according to the situations.

FIG. 30 shows a processing procedure of the camera angle control. The direction of the camera 202 has to be so controlled according to the water level so that the boundary portion between the measuring plate and the water surface may be located at the center of the frame.

For this necessity, the camera position control means 231 reads at first the previous water-level measurement result hx from the database (at D-101). Then, the present camera setting angle (i.e., camera angle) is calculated (at D-102), as follows, and is transmitted (at D-103) to a camera position control mechanism which is mounted on a mica bed 212.

Since the altitude $H_0$ of the camera mounting position and the distance $L_0$ between the camera 202 and the measuring plate 203 are known, as shown in FIG. 17, the camera setting angle can be calculated from the following equation:

$$=tan^{-1}((H_0-hx)/L_0).$$

This camera position control is so programmed that it is executed just before the water-level measurement. Since the water-level measurement is executed at such a period that the water level is hardly changed, no problem arises even if the camera setting angle is determined from the previous water level. As a result, the water-surface boundary portion of the measuring plate is controlled to be in the neighborhood of the frame center at all times even with a change in the water level, the detection accuracy can be improved by narrowing the visual field of the camera.

The setup processing capable of easily changing the reference position of the water-level measurement will be described in the following with reference to FIGS. 31 and 32.

Figure 31A:
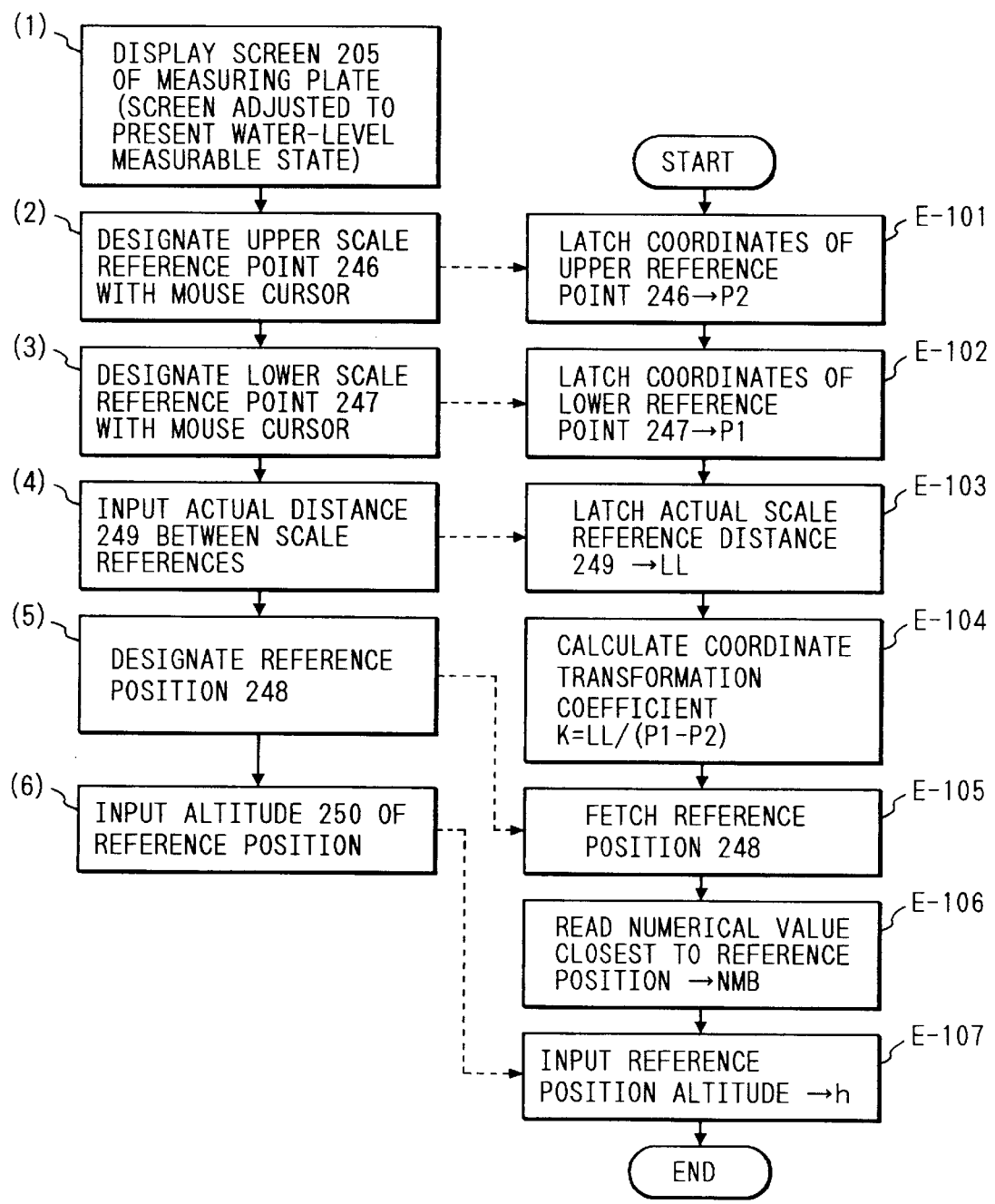

FIG. 31 is an explanatory diagram showing the processing procedure of the setup. This procedure is executed when the operation is set up by changing the measuring plate to be measured. In FIG. 31A, (1) to (6) indicate the steps of the observer, and E-101 to E-106 indicate the steps of set up means 30d.

When the image 205 of the measuring plate to be measured is taken and displayed, as shown in FIG. 31B, the observer confirms whether or not the scene is normal to have the water-surface boundary 209 in the neighborhood of the frame center, and the camera position is operated and controlled (at (1)).

Next, an inputting step is executed to achieve the coordinate transformation coefficient. When an upper scale reference point 246 and then a lower point 247 are indicated by a cursor (at (2) and (3)), their coordinates P2 and P1 are fetched and stored (at E-101 and E-102). The actual distance LL between these two points 249 is inputted through a keyboard (at (4)) and latched (at E-103). As a result, the coordinate transformation coefficient K is calculated by (Eq. 2) (at E-104):

$$K=LL/(P1-P2).$$

Next, a procedure for setting the reference position for the water-level measurement is executed. When the graduation having the maximum or next numeral such as the upper point 246 is indicated to the reference position 248 on the image 205 with the cursor (at (5)), the reference position is fetched as P2 (at E-105), and its numeral NMB (e.g., 8 in FIG. 31B) is read out by a letter recognition (at E-106). The numeral NMB may be inputted by the observer through the keyboard. Finally, when the real altitude 250 of the reference position is inputted through the keyboard (at (6)), the altitude h is fetched and latched (at E-107).

Figure 32A:
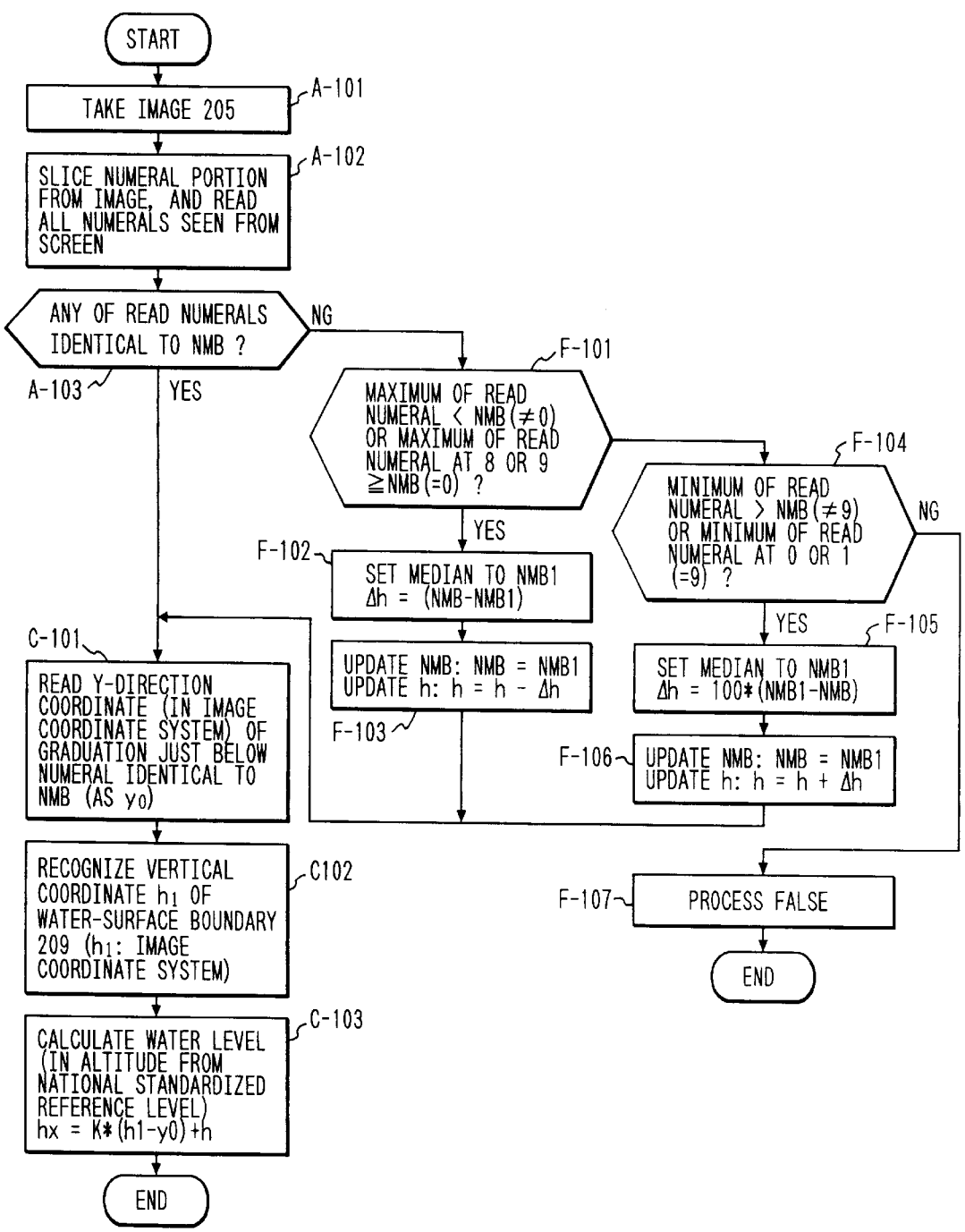
FIGS. 32A, 32B and 32C present diagrams for explaining the updating procedure of a reference position and the water-level deciding procedure according to one embodiment of the present invention.
Figure 32B:
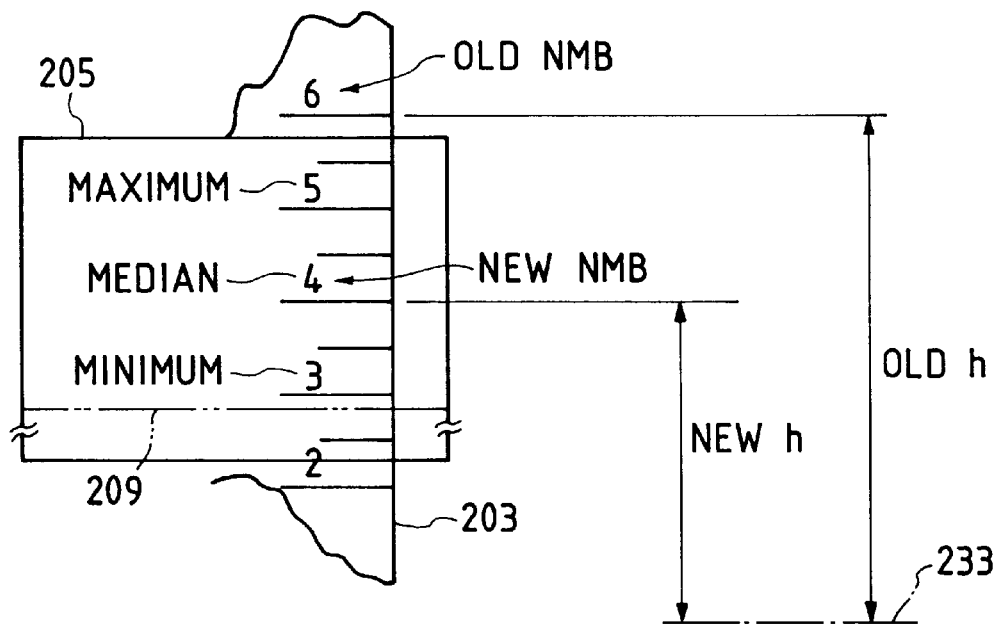

FIG. 32 shows a processing flow for measuring the water level while updating the reference position in a manner to correspond to the fluctuation of the water level. Steps A and C, as shown in FIG. 32A, are detailed from Blocks A and C of FIG. 18. Step F indicates the updating of the reference position and is executed either as a portion of Step A by the reference position recognizing means 224 or as the additional function of the setup means 230d.

First of all, the image 205 of the measuring plate is taken (at A-101), and all numerals are sliced from the image 205 and read by the letter recognition method such as pattern matching so that they are arranged in the order of magnitude (at A-102). Next, it is checked (at A-103) whether or not any of the read numerals is identical to the set NMB. If this answer is YES, the water-level calculation of Step C is executed by using the reference value at the previous measurement time.

When, on the other hand, the camera position is controlled according to the previous water level (or the fluctuation of the previous or later water level) so that the previous NMB cannot be recognized, no numeral is identical to the latched NMB so that the reference position is updated. First of all, a comparison is made between the maximum of the read numerals and the NMB (at F-101). If the NMB is larger, the water level drops so that the camera is corrected downward from the previous position. In this case, the median of the read numerals is set to NMB1 to determine a difference Δh from the NMB (at F-102). Moreover, NMB=NMB1, and the altitude h of the reference position is updated to h=h−Δh (at F-103).

In case the NMB is smaller, on the other hand, it is decided (at F-104) whether or not the minimum of the read numerals is larger than the NMB. If this answer is YES, the camera is corrected upward from the previous position. In this case, the median of the read numerals is set to NMB1 to determine a difference Δh from the NMB (at F-105), and NMB=NMB1, and the altitude h of the reference position is updated to h=h+Δh (at F-106). Incidentally, the median may be replaced by an approximate value thereof.

Incidentally, the read numeral near the graduation of the actual measuring plate has one figure of a repetition of 0 to 9. In this case, the aforementioned decision of Step F-101 is valid only for NMB 0. For NMB=0, therefore, the camera is corrected downward in case the maximum of the read numerals is 8 or 9, and the decision holds (YES). FIG. 32 illustrates the updating of the reference position of this case.

Likewise, the aforementioned decision of Step F-104 is valid for NMB 9. If NMB=9, the camera is corrected upward in case the minimum of the read numerals is 0 or 1, and the decision holds (YES). However, this is conditioned by the fact that the area of the image 205 does not exceed the gap (of 200 mm) of two numerals for the measuring time period. If this condition is violated, the updating of the reference value is false (at F-107), and the procedure is ended by demanding the setup again.

Incidentally, the decision of the fluctuating direction of Steps F-101 and F-104 may be replaced by deciding the upward/downward direction directly by utilizing the camera position control signal.

Figure 32C:
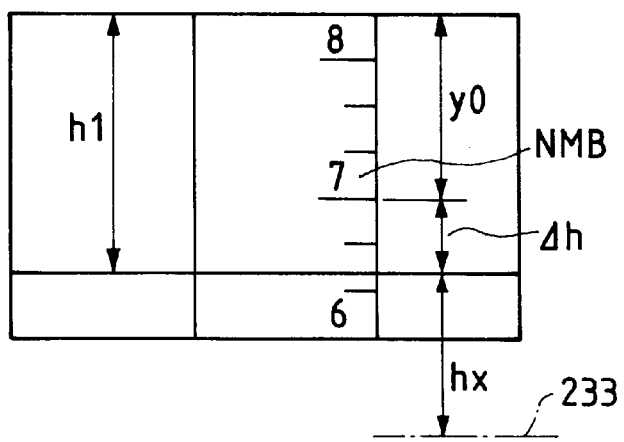

Next, the processing by the water-level determining means will be described in the following. First of all, the vertical coordinate y0 (as shown in FIG. 32C) of a graduation corresponding to (or just below) the numeral identical to the NMB is read out (at C-101). Next, the coordinate h1 of the water-surface boundary 209, as detected by the aforementioned image processing (i.e., the vertical plate method or the oblique plate method), is received from the water-surface position recognizing means 225 (at C-102). From these two coordinates, the position hx of the water surface conforming to the altitude of the national standardized reference is calculated from the following equation:

$$hx = K \cdot E(h1-y0) + h.$$

Thus, according to the reference position updating of the present embodiment and the water-level measurement by the former, a highly accurate water-level measurement can be accomplished in real time even if the water level abruptly fluctuate to control the camera position.

There are provided the water-level measuring system thus far described and the optical disc or VTR image recording system for measuring the water level in real time, so that the graphic data are latched in a retrieving mariner to measure the water level later in a historical manner thereby to analyze an accident or effect a simulation.

According to the embodiments thus far described, the water level of flowing water having waves can be measured by the novel measurement method using the image processing, although difficult in the prior art, so that the burden upon the observer can be drastically lightened. Moreover, the measurement method according to the brightness of the water surface can be selected to improve the accuracy of the water-level measurement by day and night. According to the present invention, furthermore, the water-level measuring system can be adapted to the circumstance which are so wide that the state of the water surface fluctuates from still water to flowing water or vice versa, so that its reliability and application range can be remarkably improved. Furthermore, the camera position control and the reference position according to the water-level fluctuation can be updated by measuring the water level by image processing, so that the measurement can be accurately executed in real time even for an abrupt change in the water level while lightening the burden upon the observer.

As another embodiment, here will be described a system for and a method of measuring the flow direction and velocity in a river or canal by the image processing.

Figure 33:
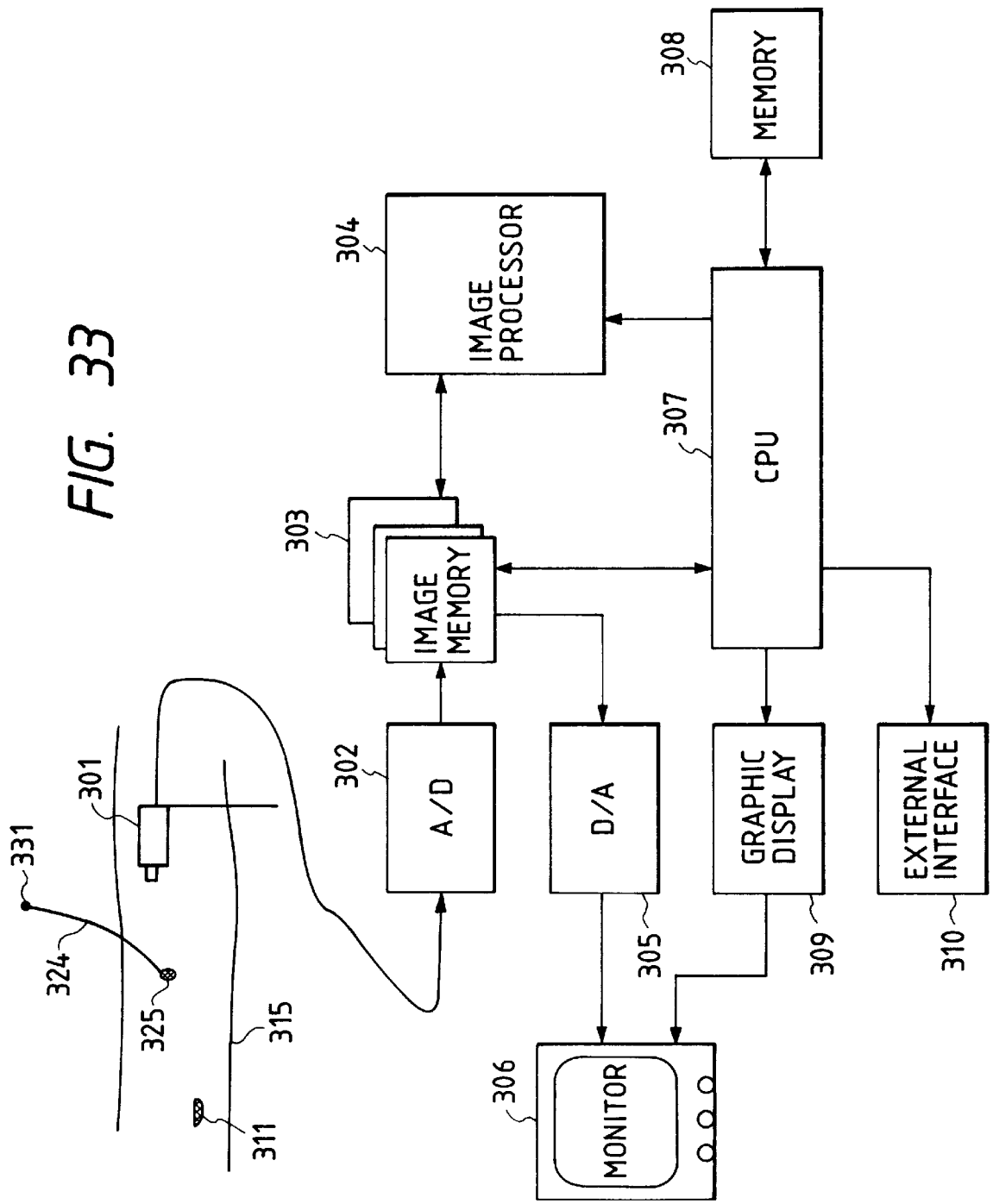
FIG. 33 is a block diagram showing the construction of a flow-direction/flow-velocity measuring system.

This embodiment of the present invention will be described with reference to FIG. 33.

In the flow direction/velocity measuring system of the present embodiment, in response to a command from a CPU 307, either a floating object 31 flowing in a river 315 or a float 325 moored through a string (or rope) 324 by a mooring member 331 is taken as image signals by a camera 301, and these image signals are converted in about 128 grades of R, G and B, for example, by an A/D converter 302 until they are latched in an image memory 303. The image signals are processed, if necessary, by an image processor 304, and the resultant picture is outputted through a D/A converter 305 to a monitor 306. On the other hand, the calculations of the flow direction or flow velocity are carried out in the CPU 307 by using a memory 308, and the result is displayed as letter or graphic information in the monitor 306 through a graphic display 309 or outputted to the outside through an external interface 310.

Figure 34A:
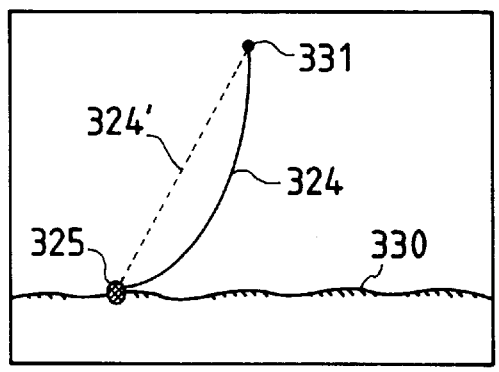
Figure 34B:
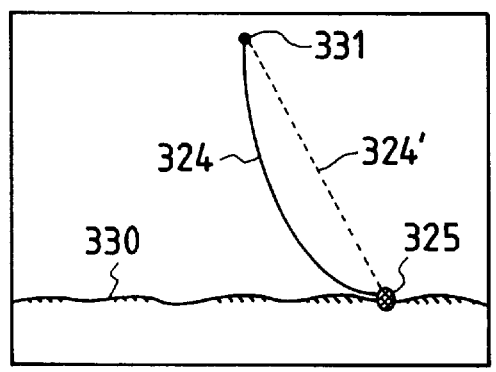
Figure 34C:
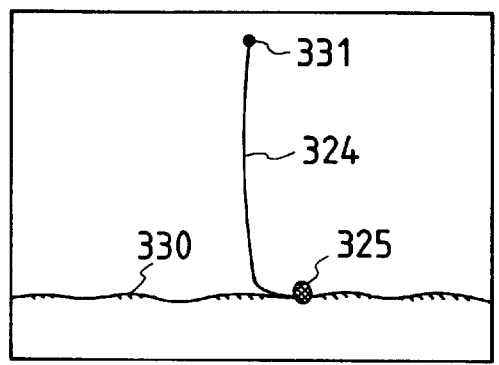
Figure 35:
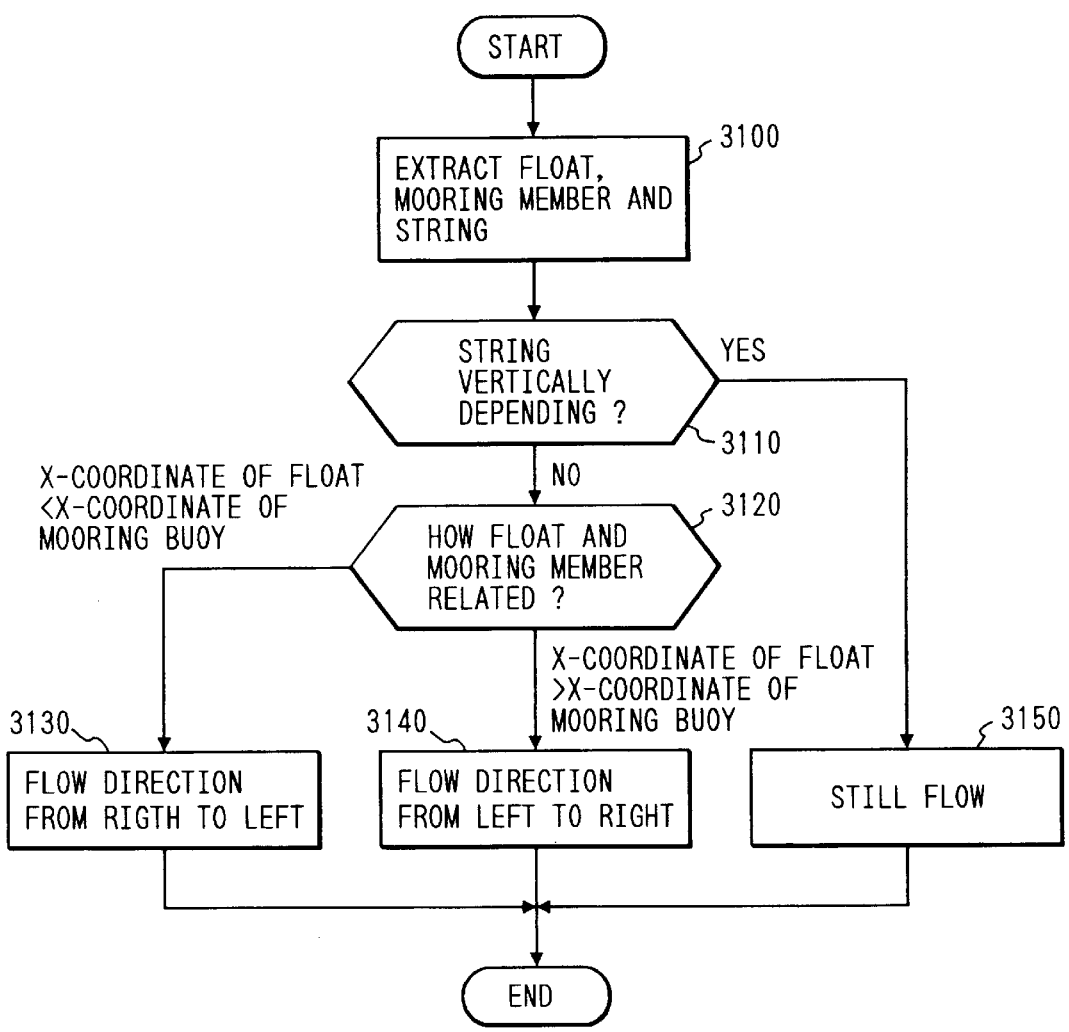
Figure 36A:
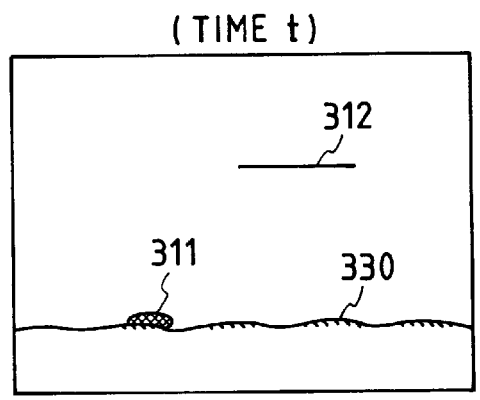
FIGS. 36A, 36B, 36C, 36D and 36E present explanatory diagrams showing the procedure for measuring the flow-direction/flow-velocity by using a floating object.
Figure 36B:
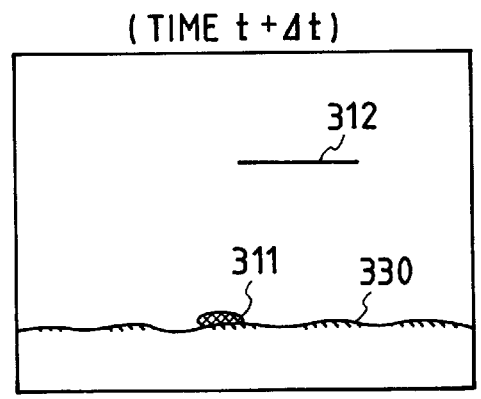
Figure 36C:
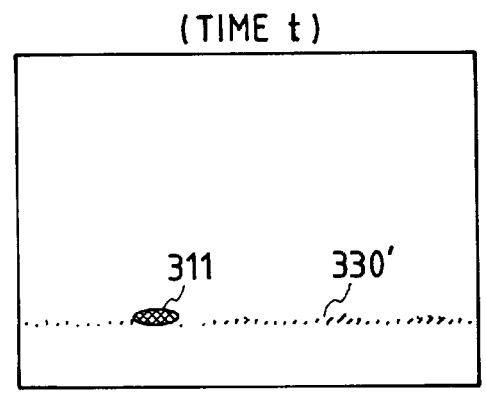
Figure 36D:
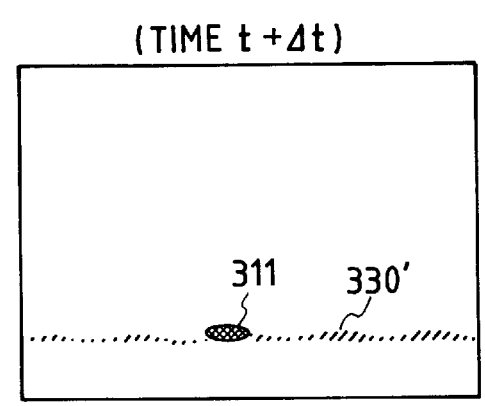
Figure 36E:
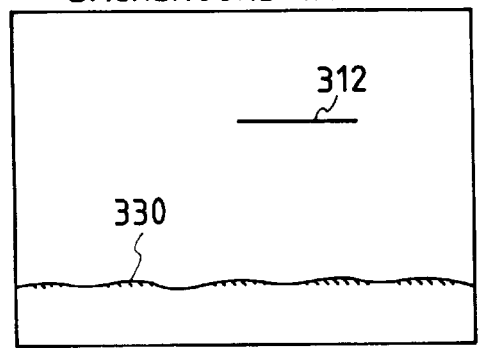

With reference to FIGS. 34 and 35, here will be described the method of determining the direction of the stream of a river, i.e., the flow direction by using a float which is artificially moored through a string or rope. FIG. 34 shows an image (including the float 325 floating on a water surface 330) taken by the camera 301. It is assumed in FIG. 34 that the float 325 having a detectable color is moored by the mooring member 331 having a detectable color through the string 324 having a detectable color. The float 325 is desired to have its half submerged in the water and to have a shape (such as a cube) for receiving little wind resistance. The string is tensed into a generally straight line, as indicated at 324' by a broken line, for a strong stream but not tensed to draw an arc, as; indicated at 324 by a solid line, for a weak stream. The image is latched in the image memory 303 and is processed by the image processor 304. In this image processor 304, the float 325, the mooring member 331 and the string 324 joining the two are extracted at first from the image (at Step 3100). Next, the string is drawn from the color (e.g., red) information of the string 324, and it is determined from the x-projection distribution (at Step 3110) whether or not the string depends generally vertically. If this answer is NO, the positional information of the float 325 and the mooring member 331, as detected at Step 3100, is determined to check the positional relation between the two members (at Step 3120). In case the x-coordinate of the float 325 is smaller than that of the mooring member 331, that is, in case the float 325 is located at the lefthand side of the mooring member 331, as shown in FIG. 34A, the flow direction is determined to be from the right to the left, and this information is displayed in the monitor 306 through the graphic display 309 and outputted to the outside through the external interface 310 (at Step 3130). In case the x-coordinate of the float 325 is larger than that of the mooring member 331, that is, in case the float 325 is located at the righthand side of the mooring member 331, as shown in FIG. 34B, the flow direction is determined to be from the left to the right, and this information is displayed in the monitor 306 through the graphic display 309 and outputted to the outside through the external interface 310 (at Step 3140). In case, on the other hand, the string is determined at Step 3110 to depend generally vertically, as shown in FIG. 34C, it is determined that the flow is still, and the information is displayed in the monitor 306 through the graphic display 309 and outputted to the outside through the external interface 310 (at Step 3150).

With reference to FIGS. 36 and 37, here will be described the method of determining the flow direction of a river, i.e., the flow direction and/or the flow velocity by using a flowing object floating on the water surface. FIG. 36 is composed of: FIGS. 36A and 36B showing images taken by the camera 301; FIGS. 36C and 36D showing processed images; and FIG. 36D showing a background image. These images are latched in the image memory 303 and processed by the image processor 304.

FIG. 37 shows a flow of the procedures to be executed by the image processor 304 and the CPU 307. In the image processor 304, first of all, there is extracted (at Step 3200) a difference image (of FIG. 36C) between the input image (of FIG. 36A) at a time t and the background image (of FIG. 36E) latched in advance in the image memory 303. The difference image is cleared of the noise, which is caused by the fluctuating portion 330' or the like of the water surface, and the floating object 311 is extracted (at Step 3210). The featuring quantities (e.g., the area, coordinates of the center of gravity and the circumscribed ellipse) of the extracted floating object 311 are determined (at Step 3220), and the routine returns to Step 3200. Then, a difference image (of FIG. 36D) between the input image (of FIG. 36B) at a time t+Δt and the background image (of FIG. 36E) latched in advance in the image memory 303 is extracted (at Step 3200), and the operations of Steps 3210 and 3220 are executed as before.

The following operations are executed by the CPU 307. A plurality of objects are usually extracted from one image. By using the featuring quantities of the individual objects determined at Step 3220, therefore, a correspondence is made of the object between the two screens (at Step 3230). After this correspondence, the moving distance of the object between the two times and the moving direction are calculated by using the coordinates of the center of gravity at the individual times, to determine the average moving distance (at Step 3240). Since what is determined here is the moving distance of the image coordinate system, a transformation coefficient, as determined in advance, between the two coordinates, i.e., the image coordinate system and the real spatial coordinate system is used. Alternatively, either an object contained in the input image and having a known length or a reference mark 312 is detected to determine the transformation coefficient from the known length, so that the moving distance in the image coordinate system is transformed by using the determined coefficient into that of the real physical spatial coordinate system (at Step 3250). By using the known time interval Δt, moreover, the flow velocity is determined from the moving distance/Δt (at Step 3260).

According to the present embodiment, the flow direction and/or flow velocity can be automatically measured to lighten the burden upon the observer.

What is claimed is:

1. A method of measuring a position of a liquid surface by using a camera to take an image of the liquid surface to be measured and an image processor to process the image taken by the camera, comprising:

the step of taking with the camera an image of the liquid surface, a measuring plate that is perpendicularly disposed with respect to the liquid surface, and a sub-measuring plate that is obliquely disposed with respect to the liquid surface, and the step of analyzing the image, to estimate the boundary position of the liquid surface on the measuring plate and the sub-measuring plate in order to determine the position of the liquid surface on the image.

2. A method of measuring a position of a liquid surface by using a camera to take an image of the liquid surface to be measured and an image processor to process the image taken by the camera, comprising:

the step of taking with the camera the image of the liquid surface, a measuring plate that is perpendicularly disposed with respect to the liquid surface, and a sub-measuring plate that is obliquely disposed with respect to the measuring plate, and the step of analyzing the image to estimate the boundary position of the liquid surface on the measuring plate and the sub-measuring plate in order to determine the position of the liquid surface on the image.

3. A method of measuring a position of a liquid surface by using a camera to take an image of the liquid surface to be measured and an image processor to process the image taken by the camera, comprising:

the step of taking with the camera the image of the liquid surface, a measuring plate that indicates a measured position the liquid surface, and a sub-measuring plate that is obliquely disposed with respect to the liquid surface, and the step of analyzing the image to estimate the boundary position of the liquid surface on the measuring plate and the sub-measuring plate in order to determine the position of the liquid surface on the image.

4. A method of measuring a position of a liquid surface by using a camera to take an image of the liquid surface to be measured and an image processor to process the image taken from the camera, comprising:

taking with the camera the image of the liquid surface, a measuring plate that indicates a boundary position of the liquid surface, and a sub-measuring plate that is obliquely disposed with respect to measuring plate, and analyzing the image to estimate the boundary position of the liquid surface on the measuring plate and the sub-measuring plate in order to determine the position of the liquid surface on the image.

5. A method of measuring a position of a liquid surface according to claim 1, and further comprising the step of transforming the determined position of the liquid surface on the image from an image system of coordinates to a real position of the liquid surface.

6. A method of measuring a position of a liquid surface according to claim 1, and further comprising the step of analyzing a color changed portion of the boundary position and its reflected image to determine upper and lower limit lines of the color changed portion and to set the middle position of the determined upper and lower limit lines as the position of the liquid surface.

7. A method of measuring a position of a liquid surface according to claim 1, further comprising:

the step of taking an image of reflection or refraction of the sub-measuring plate that is reflected or refracted on the liquid surface with the camera, the step of distinguishing a bending position from the taken reflection or refraction image, and the step of determining the position of the liquid surface from the bending position.

8. A method of measuring a position of a liquid surface by using a camera to take an image the liquid surface to be measured and an image processor for processing the image taken with the camera, comprising:

the step of taking with the camera the image of the liquid surface, a measuring plate that is measured at water level of the liquid surface, and a sub-measuring plate that is recognized at a boundary position of the liquid surface, and the step of analyzing the image to estimate the position of the liquid surface on the measuring plate and the sub-measuring plate in order to determine the position of the liquid surface on the image.

9. Equipment for measuring a position of a liquid surface using a camera to take an image of the liquid surface to be measured and an image processor to process the image taken with the camera comprising:

a camera taking the image of the liquid surface, a measuring plate that indicates measured position of the liquid surface, and a sub-measuring plate that is obliquely disposed with respect to the liquid surface, and an analyzer analyzing the image to estimate the position of the liquid surface on the measuring plate and the sub-measuring plate in order to determine the position of the liquid surface on the image.

* * * * *

UNITED STATES PATENT AND TRADEMARK OFFICE
CERTIFICATE OF CORRECTION

PATENT NO.  : 6,098,029                                  Page 1 of 3

DATED       : August 1, 2000

INVENTOR(S) : TADAGI et al.

It is certified that error appears in the above-identified patent and that said Letters Patent is hereby corrected as shown below:

| Column | Line | |
|---|---|---|
| 1 | 43 | Delete "l". |
| 4 | 32 | Change "thee" to -- the --. |
| 5 | 22 | Change "water- level" to -- water-level --. |
| 8 | 54 | Change "Block" to -- Block G): --. |
| 11 | 65 | Change "may be" to -- are equally --. |
| 11 | 66 | After "of" delete "the"; after "or" delete "the". |
| 12 | 1 | Change "B" to -- 8 --. |
| 12 | 13 | Change "(H.)" to -- ($H_o$) --. |
| 12 | 31 | Change "summaries" to -- combined extent or sum --. |
| 12 | 43 | Change "highly" to -- greatly --. |

UNITED STATES PATENT AND TRADEMARK OFFICE
CERTIFICATE OF CORRECTION

PATENT NO. : 6,098,029

DATED : August 1, 2000

INVENTOR(S) : TADAGI et al.

It is certified that error appears in the above-identified patent and that said Letters Patent is hereby corrected as shown below:

| Column | Line | |
|---|---|---|
| 16 | 12 | Change "&" to -- and --. |
| 16 | 15 | After "system" delete ",". |
| 17 | 17 | Change "in put" to -- in-put --. |
| 18 | 34 | After "is" delete ";". |
| 19 | 27 | Delete "is". |
| 19 | 51 | Change "with the" to -- over --. |
| 20 | 51 | Change "System" to -- system --. |
| 21 | 6 | Change "stream lit" to -- stream. At --. |
| 22 | 62 | Change "In case" to -- When --. |
| 23 | 7 | Change "NMB 0" to -- NMB $\neq$ 0 --. |

UNITED STATES PATENT AND TRADEMARK OFFICE
CERTIFICATE OF CORRECTION

PATENT NO. : 6,098,029

DATED : August 1, 2000

INVENTOR(S) : TADAGI et al.

It is certified that error appears in the above-identified patent and that said Letters Patent is hereby corrected as shown below:

| Column | Line | |
|--------|------|---|
| 23 | 12 | Change "NMB 9" to -- NMB ≠ 9 --. |
| 23 | 58 | Change "circumstance" to -- circumstances --. |

Signed and Sealed this

Fifteenth Day of May, 2001

Attest:

NICHOLAS P. GODICI

Attesting Officer

Acting Director of the United States Patent and Trademark Office